United States Patent
Höglund et al.

(10) Patent No.: US 12,089,156 B2
(45) Date of Patent: Sep. 10, 2024

(54) ROTATION OF GROUP WAKE-UP SIGNAL

(71) Applicant: Telefonaktiebolaget LM Ericsson (publ), Stockholm (SE)

(72) Inventors: Andreas Höglund, Solna (SE); Magnus Åström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 17/640,131

(22) PCT Filed: Oct. 2, 2020

(86) PCT No.: PCT/SE2020/050933
§ 371 (c)(1),
(2) Date: Mar. 3, 2022

(87) PCT Pub. No.: WO2021/066727
PCT Pub. Date: Apr. 8, 2021

(65) Prior Publication Data
US 2022/0303894 A1  Sep. 22, 2022

(51) Int. Cl.
*H04W 52/02* (2009.01)
*H04L 1/1607* (2023.01)

(52) U.S. Cl.
CPC ....... *H04W 52/0219* (2013.01); *H04L 1/1642* (2013.01); *H04W 52/0232* (2013.01)

(58) Field of Classification Search
CPC ............. H04W 76/28; H04W 52/0216; H04W 52/0229; H04W 68/02; H04W 52/0219; H04W 52/02
(Continued)

(56) References Cited

U.S. PATENT DOCUMENTS 11,653,306 B2 *   5/2023  Ye .................... H04W 72/0446
                                                        370/311
2019/0090190 A1   3/2019  Liu et al.
(Continued)

FOREIGN PATENT DOCUMENTS

EP   4030831 A1 *  7/2022  ........ H04W 52/0216
EP   4236601 A2 *  8/2023  ........ H04W 52/0235
(Continued)

OTHER PUBLICATIONS

"Feature lead summary of 6.2.1.1 UE group MWUS", 3GPP TSG-RAN WG1 #98, R1-1909394, Prague, CZ, Aug. 26-30, 2019, pp. 1-13.
(Continued)

*Primary Examiner* — David Q Nguyen
(74) *Attorney, Agent, or Firm* — Murphy, Bilak & Homiller, PLLC

(57) ABSTRACT

Embodiments include methods, for a user equipment (UE), to monitor for wake-up signals (WUS)transmitted by a network node in a radio access network (RAN). The methods include determining a second WUS resource for use during a first monitoring occasion associated with a WUS group assigned to the UE, based on the following: an identifier of a first WUS resource, wherein the first and second WUS resources are part of a first number of configured WUS resources for transmission of WUS; the first number of configured WUS resources; and a system frame number (SFN) or hyper-SFN (HSFN) associated with the RAN. The methods also include monitoring for a WUS, from the network node, in the second WUS resource during the first monitoring occasion. Embodiments also include complementary methods for a network node, and UEs and network nodes configured to perform such methods.

22 Claims, 13 Drawing Sheets

(58) Field of Classification Search
USPC .................... 370/318, 328, 329, 330, 331
See application file for complete search history.

(56) References Cited

U.S. PATENT DOCUMENTS

| | | | |
|---|---|---|---|
| 2019/0103950 A1 | 4/2019 | Liu et al. | |
| 2019/0150094 A1 | 5/2019 | Liu et al. | |
| 2022/0295405 A1* | 9/2022 | Seo .................. | H04W 72/12 |
| 2022/0312327 A1* | 9/2022 | Xu .................... | H04W 56/001 |
| 2023/0209464 A1* | 6/2023 | Tsai .................. | H04L 5/0053 |
| | | | 370/311 |
| 2024/0155495 A1* | 5/2024 | Hosseini ........... | H04W 72/23 |

FOREIGN PATENT DOCUMENTS

| | | | |
|---|---|---|---|
| JP | 2017220919 A | 12/2017 | |
| JP | 2020535720 A | 12/2020 | |
| WO | 2018175760 A1 | 9/2018 | |
| WO | 2019064208 A1 | 4/2019 | |

OTHER PUBLICATIONS

"UE-group wake-up signal", 3GPP TSG RAN WG1 Meeting #98, R1-1908086, Prague, Czech Republic, Aug. 26-30, 2019, pp. 1-9.

"3GPP TS 36.211 V15.6.0", 3rd Generation Partnership Project; Technical Specification Group Radio Access Network; Evolved Universal Terrestrial Radio Access (E-UTRA); Physical channels and modulation (Release 15), Jun. 2019, pp. 1-239.

"3GPP TS 36.213 V15.6.0", 3rd Generation Partnership Project; Technical Specification Group Radio Access Network; Evolved Universal Terrestrial Radio Access (E-UTRA); Physical layer procedures (Release 15), Jun. 2019, pp. 1-551.

"3GPP TS 36.304 V15.4.0", 3rd Generation Partnership Project; Technical Specification Group Radio Access Network; Evolved Universal Terrestrial Radio Access (E-UTRA); User Equipment (UE) procedures in idle mode (Release 15), Jun. 2019, pp. 1-55.

"3GPP TS 36.331 V15.6.0", 3rd Generation Partnership Project; Technical Specification Group Radio Access Network; Evolved Universal Terrestrial Radio Access (E-UTRA); Radio Resource Control (RRC); Protocol specification (Release 15), Jun. 2019, pp. 1-960.

"Chairman's notes of Al 6.2.1 Additional MTC Enhancements", 3GPP TSG RAN WG1 Meeting #98, R1-1909747, Prague, CZ, Aug. 26-30, 2019, pp. 1-9.

"Discussion on UE-group wake up signal in MTC", 3GPP TSG RAN WG1 #98, R1-1909167, Prague, CZ, Aug. 26-30, 2019, pp. 1-3.

"Group WUS", 3GPP TSG-RAN WG2 #108, Tdoc R2-1915801, Reno, Nevada, US, Revision of R2-1913776, Nov. 18-22, 2019, pp. 1-10.

"Group WUS", 3GPP TSG-RAN WG2 #107bis, Tdoc R2-1913776, Chongqing, China, Oct. 14-18, 2019, pp. 1-9.

"Remaining topics for UE-group wake-up signal in NB-IoT", 3GPP TSG-RAN WG1 Meeting #98, R1-1909716, Prague, Czech Rep., Aug. 26-30, 2019, pp. 1-4.

* cited by examiner

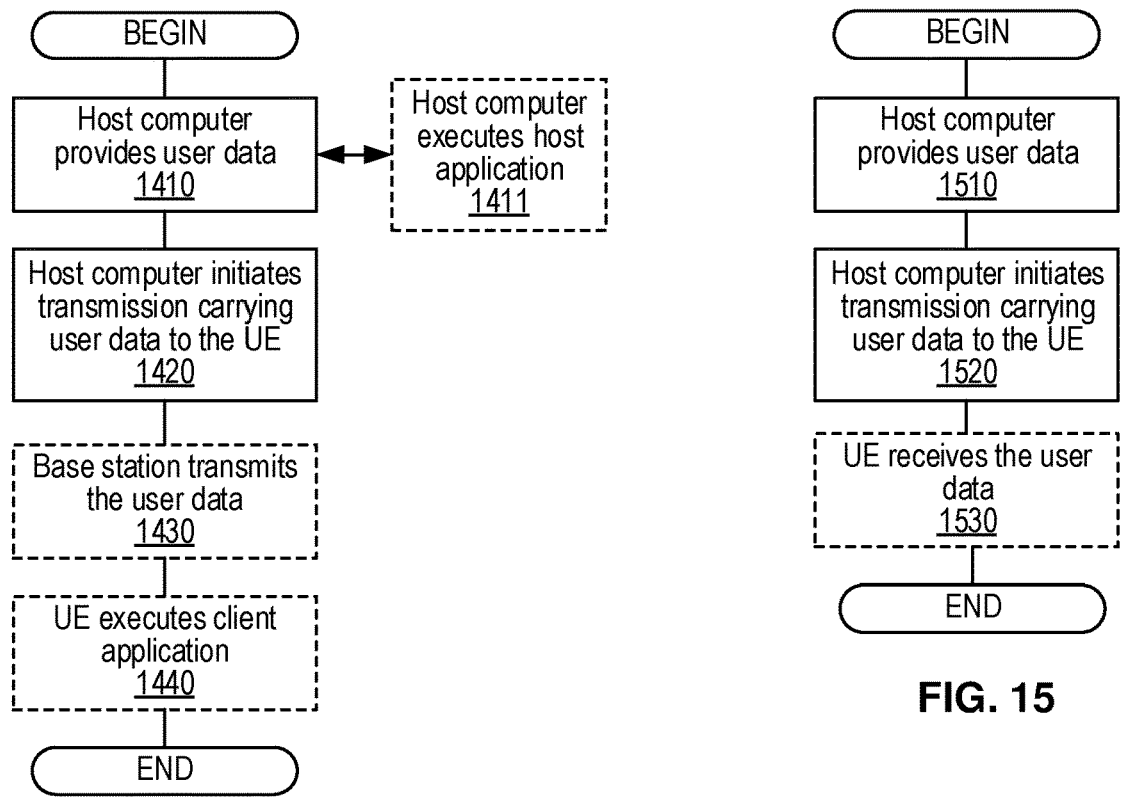
FIG. 14
FIG. 15
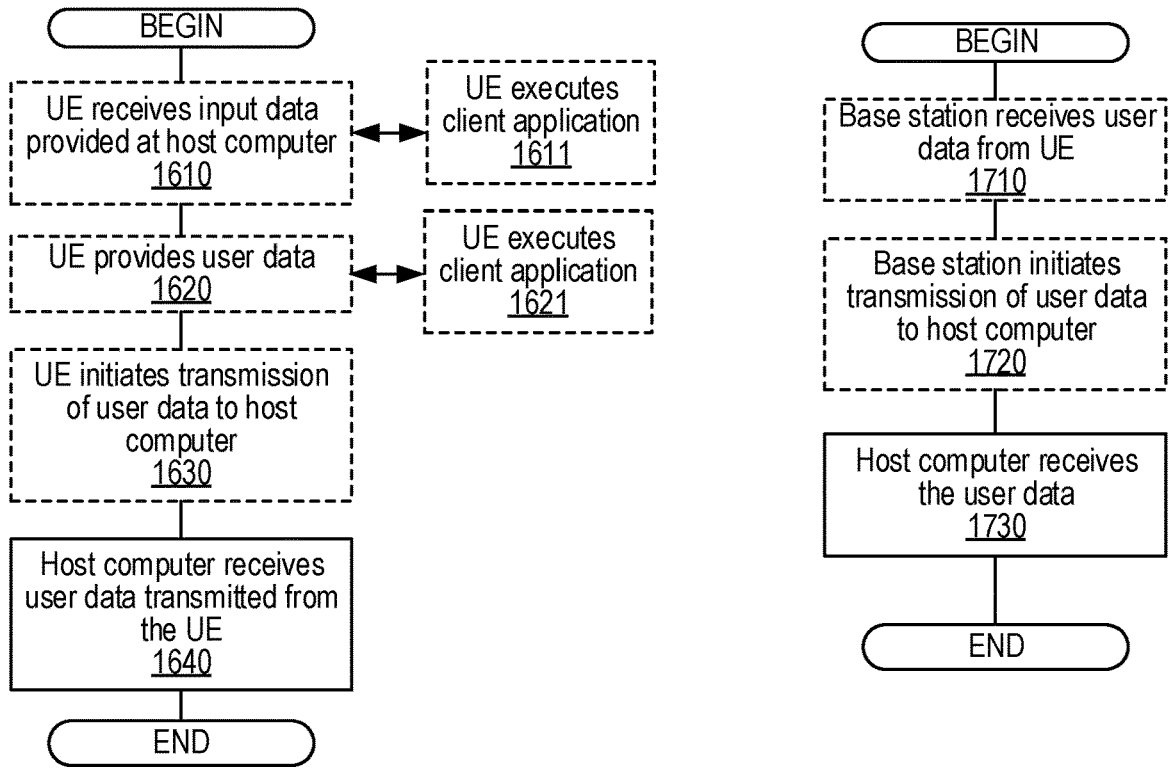
FIG. 16
FIG. 17

ROTATION OF GROUP WAKE-UP SIGNAL

TECHNICAL FIELD

The present application relates generally to the field of wireless communication networks and systems, and more specifically relates to improvements in wireless device energy consumption by use of wake-up signals (WUS).

BACKGROUND

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs).

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115.

Each of the eNBs can serve a geographic coverage area including one more cells, including cells 106, 111, and 116 served by eNBs 105, 110, and 115, respectively. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user—and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRA_IDLE state, the UE's radio is active on a discontinuous reception (DRX) schedule configured by upper layers. During DRX active periods (also referred to as "DRX On durations"), an RRC_IDL UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state. UEs in RRC_CONNECTED state can also be configured with DRX (also known as "CDRX").

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (for 15-kHz SCS) or 24 (for 7.5-kHz SCS). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz subcarrier bandwidth, a PRB pair comprises 168 REs. The configuration of 15-kHz SCS and normal CP is often referred to as a numerology, μ.

Exemplary LTE FDD uplink (UL) radio frames can be configured in a similar manner as the exemplary FDD DL radio frame shown in FIG. 3. For example, using terminology consistent with the above DL description, each UL slot consists of $N^{UL}_{symb}$ OFDM symbols, each of which includes $N_{sc}$ OFDM subcarriers.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

In Rel-13 and Rel-14, 3GPP developed specifications for narrowband Internet of Things (NB-IoT) and machine-to-machine (M2M) use cases. These new radio access technologies provide connectivity to services and applications demanding qualities such as reliable indoor coverage and high capacity in combination with low system complexity and optimized device power consumption. LTE-M and NB-IoT enhancements include new DL control channels, respectively MPDCCH and NPDCCH.

In LTE, a UE in RRC_CONNECTED state monitors PDCCH for DL scheduling assignments (e.g., for PDSCH), UL resource grants (e.g., for PUSCH), and for other purposes. Depending on DRX configuration, a UE may spend a substantial part of its energy on decoding PDCCH without detecting a DL scheduling assignment or UL resource grant directed to it. Techniques to reduce unnecessary PDCCH monitoring, allow a UE to go to sleep more often and/or for longer periods, or allow a UE to wake up less frequently and/or for shorter periods can be beneficial.

One such technique introduced in LTE Rel-15 for LTE-M and NB-IoT is a Wake-up Signal (WUS) that can be detected by a UE using much less energy relative to MPDCCH/NPDCCH detection (referred to generically herein as "PDCCH detection"). When a UE detects a WUS intended for it, the UE will wake up and activate a conventional PDCCH decoder. The Rel-15 WUS uses a single WUS sequence per paging occasion (PO), such that all UEs belongs to the same group. In other words, a transmitted WUS associated with a specific PO may wake-up all UEs that are configured to detect paging at that PO. Thus, UEs not targeted by the page will wake up unnecessarily, leading to increased energy consumption.

WUS grouping (also referred to as group WUS or GWUS) is a feature in LTE Rel-16. In this technique, UEs are further divided into subgroups such that the number of UEs that are sensitive to a GWUS is less than all UEs associated with a PO related to the GWUS. This feature is intended to improve DL transmission efficiency and/or reduce UE energy consumption. Even so, there are various issues, drawbacks, and/or problems that can occur when Rel-16 UEs (GWUS) are deployed in a network, including when Rel-15 UEs (non-GWUS) and Rel-16 UEs (GWUS) are deployed in the same network.

SUMMARY

Exemplary embodiments disclosed herein address these and other problems, issues, and/or drawbacks of existing solutions by providing a flexible and efficient approach for enabling Rel-15 UEs (that do not support GWUS) and Rel-16 UEs (that support GWUS) to be deployed in the same network while achieving the performance gains of GWUS.

Some embodiments include various methods (e.g., procedures) for receiving wake-up signals (WUS) transmitted by a network node in a radio access network (RAN). These exemplary methods can be performed, for example, by a user equipment (UE, e.g., wireless device, IoT device, MTC device, etc. or component thereof) configured to operate in the RAN.

These exemplary methods can include determining a second WUS resource for use during a first monitoring occasion associated with a WUS group assigned to the UE. Determining the second WUS resource can be based on an identifier of a first WUS resource, wherein the first and second WUS resources are part of a first number of configured WUS resources for transmission of WUS. Determining the second WUS resource can also be based on the first number of configured WUS resources and a system frame number (SFN) or hyper-SFN (HSFN) associated with the RAN. These exemplary methods can also include monitoring for a WUS, from the network node, in the second WUS resource during the first monitoring occasion.

In some embodiments, the second WUS resource can be different from the first WUS resource. In some embodiments, the first number of configured WUS resources can be greater than two. In some embodiments, the UE can be configured with a discontinuous reception (DRX) period. In such embodiments, the DRX period can be less than or equal to a WUS resource alternation period (Palt) divided by the first number of configured WUS resources.

In some embodiments, these exemplary methods can also include receiving, from the network node, a WUS configuration that includes an identifier of the WUS group assigned to the UE, and the identifier of the first WUS resource associated with the assigned WUS group. In some embodiments, the identifier of the first WUS resource can be based on an identifier of the UE. In some embodiments, these exemplary methods can also, based on detecting the WUS during the first monitoring occasion, monitoring for a control message from the network node at a predetermined duration after the first monitoring occasion.

In some embodiments, these exemplary methods can also include determining a third resource, of the configured WUS resources, to be used during a second monitoring occasion that occurs after the first monitoring occasion and is associated with the WUS group assigned to the UE; and monitoring for a WUS, from the network node, in the third WUS resource during the second monitoring occasion.

In some of these embodiments, the second monitoring occasion can be the next subsequent monitoring occasion that is associated with the assigned WUS group. In such case, the third resource can be different from the second resource. In some variants, the third resource can also be different from the first resource.

In other of these embodiments, the second monitoring occasion can be a WUS resource alternation period (Palt) after the first monitoring occasion. In such case, the third resource can be the same as the second resource.

In various embodiments, the determining operations can be based on specific functions of the parameters mentioned above, as well as other parameters (in certain cases). Examples of such specific functions are disclosed herein.

Other embodiments include exemplary method (e.g., procedure) for transmitting wake-up signals (WUS) to one or more user equipment (UEs). These exemplary methods can be performed, for example, by a network node (e.g., eNB, gNB, or components thereof) of a radio access network (RAN, e.g., E-UTRAN, NG-RAN, etc.).

These exemplary methods can include determining a second WUS resource for use during a first monitoring occasion associated with a WUS group. Determining the second WUS resource can be based on the identifier of the first WUS resource, the first number of configured WUS resources, and a system frame number (SFN) or hyper-SFN (HSFN) associated with the RAN. In some embodiments (e.g., in some determinations), the second WUS resource can be different from the first WUS resource (i.e., the configured WUS resource). These exemplary methods can also include transmitting a WUS, to a UE assigned to the WUS group, in the second WUS resource during the first monitoring occasion.

In some embodiments, the second WUS resource can be different from the first WUS resource. In some embodiments, the first number of configured WUS resources can be greater than two.

In some embodiments, these exemplary methods can also include configuring the UE with a discontinuous reception (DRX) period. In such embodiments, the DRX period can be less than or equal to a WUS resource alternation period (Palt) divided by the first number of configured WUS resources.

In some embodiments, these exemplary methods can also include transmitting, to the UE, a WUS configuration that includes an identifier of the WUS group assigned to the UE, and the identifier of the first WUS resource associated with the assigned WUS group. In some embodiments, the identifier of the first WUS resource can be based on an identifier of the UE.

In some embodiments, the transmitted WUS can be associated with a control message pending for the UE before the first monitoring occasion. In such embodiments, these exemplary methods can also include transmitting the control message to the UE at a predetermined duration after the first monitoring occasion.

In some embodiments, these exemplary methods can also include determining a third resource, of the configured WUS resources, to be used during a second monitoring occasion that occurs after the first monitoring occasion and is associated with the WUS group; and transmitting a further WUS, to the UE assigned to the WUS group, in the third WUS resource during the second monitoring occasion.

In some of these embodiments, the second monitoring occasion can be the next subsequent monitoring occasion that is associated with the assigned WUS group. In such case, the third resource can be different from the second resource. In some variants, the third resource can also be different from the first resource.

In other of these embodiments, the second monitoring occasion can be a WUS resource alternation period (Palt) after the first monitoring occasion. In such case, the third resource can be the same as the second resource.

In various embodiments, the determining operations can be based on specific functions of the parameters mentioned above, as well as other parameters (in certain cases). Examples of such specific functions are disclosed herein. In general, network-side determining operations can be substantially similar and/or complementary to the UE-side determining operations, summarized above.

Other embodiments include UEs (e.g., wireless devices, IoT devices, MTC devices, etc. or component(s) thereof) or network nodes (e.g., base stations, eNBs, gNBs, etc. or component(s) thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIGS. 14-17 are flow diagrams illustrating various exemplary methods (e.g., procedures) for a communication system, according to various exemplary embodiments of the present disclosure.

DETAILED DESCRIPTION

Figure 1:
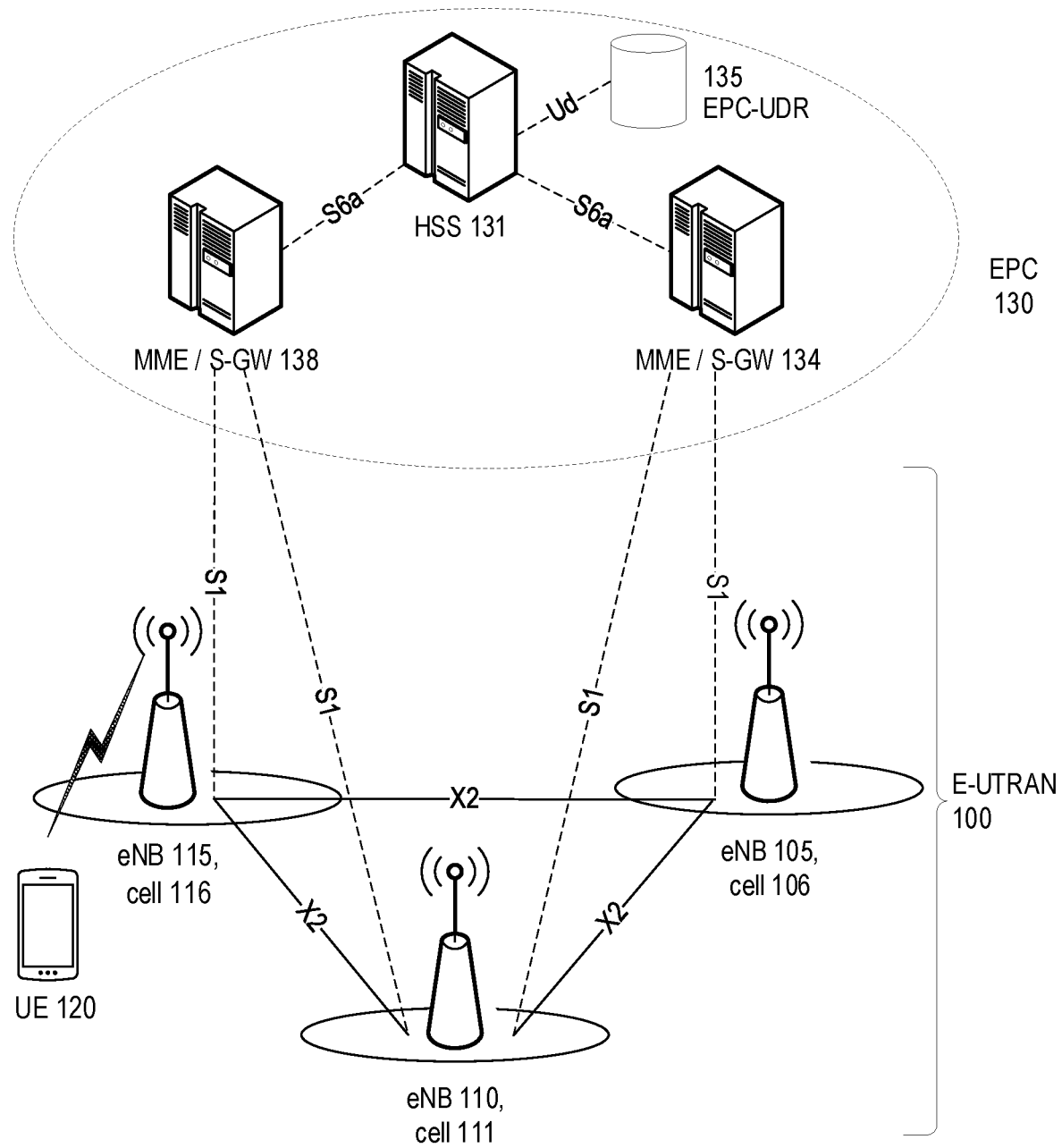
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
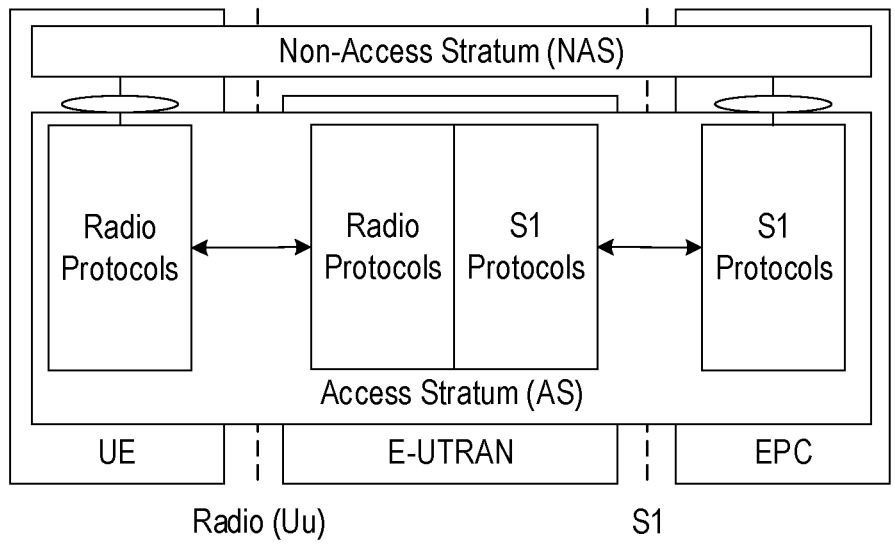
FIG. 2A is a high-level block diagram of an exemplary E-UTRAN architecture in terms of its constituent components, protocols, and interfaces.
Figure 2B:
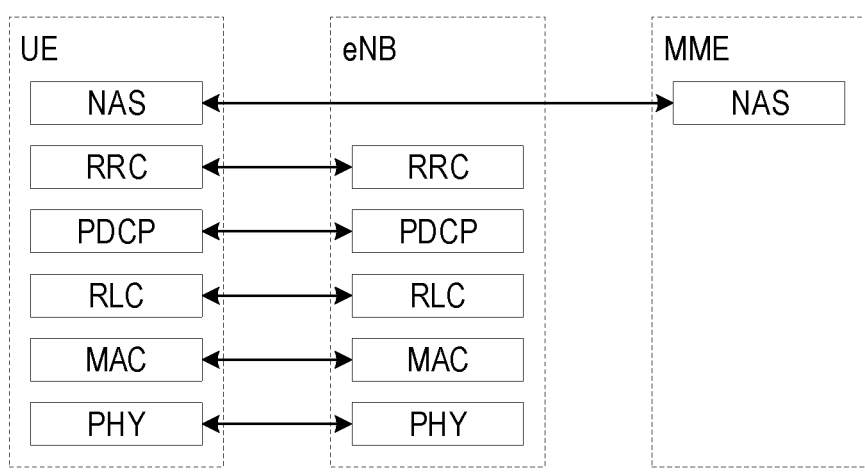
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of- Things (IoT) devices, vehicle-mounted wireless terminal devices, etc. Unless otherwise noted, the terms "wireless device" and "user equipment" (or "UE" for short) are used interchangeably herein.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, there are various issues, drawbacks, and/or problems that can occur when Rel-16 UEs (GWUS) are deployed in a network, including when Rel-15 UEs (non-GWUS) and Rel-16 UEs (GWUS) are deployed in the same network. These are discussed in more detail below.

The LTE-M specifications developed in 3GPP Rel-13 and Rel-14 include enhancements that support Machine-Type Communications (MTC, or LTE-M) with new UE categories (Cat-M1, Cat-M2), a reduced bandwidth of six PRBs for Cat-M1 (or up to 24 PRBs for Cat-M2). Similarly, the NB-IoT enhancements specified in Rel-13 and Rel-14 include a new radio interface and new UE categories, Cat-NB1 and Cat-NB2.

Bandwidth-reduced, low-complexity (BL) LTE-M UEs also can include Coverage Enhancements (CE), so that they are collectively known as BL/CE UEs. These UEs can operate in Coverage Enhancement Mode A (CEmodeA) that is optimized for no repetitions or a small number of repetitions, or in Coverage Enhancement Mode B (CEmodeB) that is optimized for moderate-to-large numbers of repetitions providing large coverage enhancement. More specifically, CEmodeA includes PRACH CE levels 0 and 1, while CEmodeB includes PRACH CE levels 2 and 3.

In general, these LTE-M enhancements introduced in Releases 13-15 for MTC will be referred to herein as "eMTC", including (not limited to) support for bandwidth limited UEs, Cat-M1, and coverage enhancements. This term is not used to refer to NB-IoT technology and enhancements, although the supported features are similar on a general level.

There are multiple differences between pre-Rel-13 LTE and the procedures and channels defined for eMTC and for NB-IoT. These differences include new physical downlink control channels (MPDCCH in eMTC, NPDCCH in NB-IoT) and a new physical random-access channel (NPRACH for NB-IoT). MPDCCH and NPDCCH are transmitted on resources of PDSCH but are logically separate from PDSCH.

Another difference is the coverage enhancement discussed above. By applying repetitions to the transmitted signals and channels, both eMTC and NB-IoT allow UE operation down to much lower SNR level compared to LTE. For example, eMTC/NB-IoT UEs can operate at Es/IoT≥-15 dB, while legacy LTE UEs operate can operate at Es/IoT≥-6 dB. Because MPDCCH and NPDCCH uses repetitions, however, the UE may consume more energy receiving and decoding them than conventional PDCCH.

To support reliable coverage in the most extreme situations, both NB-IoT and LTE-M UEs can also perform link adaptation on all physical channels using subframe bundling and repetitions. This applies to (N/M)PDCCH and (N)PDSCH in the DL, and to (N)PUSCH, (N)PRACH, and PUCCH (only for LTE-M) in the UL.

As specified in 3GPP TS 36.304, for a particular UE, the associated UEID (which is based on the UE's IMSI) determines the system frame number (SFN) of the paging frame (PF) of the UE according to the following equation:

$$\text{SFN mod } T = (T \text{ div } N)*(\text{UE\_ID mod } N), \qquad (1)$$

where "mod" is the modulus (i.e., remainder of division) operation. The paging occasions (POs) for the UE in this radio frame are then determined by the parameter i_s and the subframes pointed out by the corresponding table in 3GPP TS 36.304 section 7.2 according to:

$$i\_s = \text{floor}(\text{UE\_ID}/N) \text{ mod } N_s. \qquad (2)$$

Since i_s is determined from UE_IDs that are assumed to be distributed approximately randomly, UEs are distributed approximately randomly among different POs. For paging over narrowbands (LTE-M) and non-anchor carriers (NB-IoT), the number of IMSI bits used to determine UE_ID was increased to 14, such that UE_ID=IMSI mod 16384 for these cases.

Even so, it is not practical to use every radio frame as a PF when using repetitions. As such, LTE-M and NB-IoT UEs that share a PF will typically also share a PO. For example, if the PO density per radio frame is denoted nB/T, then nB values 2T or 4T are unlikely to be used in combination with coverage enhancements for NB LTE-M and NB-IoT.

In Rel-13 NB-IoT, paging of UEs is performed on the DL anchor carrier, which is one PRB (or 180 kHz) in bandwidth. Rel-13 also supports multi-PRB operation in which other carriers are configured, but UEs can only be assigned to those in RRC_CONNECTED state. That is, all RRC_IDLE mode operations are performed on the DL and UL anchor carriers respectively. In addition, only FDD operation is supported in Rel-13 NB-IoT.

In Rel-14, support for paging and random access was introduced on non-anchor carriers to distribute the paging and random access load over all carriers. This means that NPRACH and PCCH can be configured also for non-anchor carriers, which are then used by UEs and eNB for random access and paging accordingly.

The paging carrier in NB-IoT is determined based on UE_ID in the following way. The index for the paging carrier of a UE is the lowest value that fulfills the following condition, in which W are the paging weights for the paging carriers:

$$\text{floor}(\text{UE\_ID}/(N*N_s)) \text{ mod } W < W(0) + W(1) + \ldots + W(n). \qquad (3)$$

In contrast to NB-IoT, described above, paging in LTE-M works differently. In LTE-M several "narrowbands" can be defined, where each narrowband corresponds to six (6) non-overlapping PRBs. A UE will only monitor MPDCCH (e.g., for pages) in one narrowband at a time but frequency hopping is applied according to a specified pattern. The starting narrowband for paging is also defined based on UEID and allows for better frequency multiplexing of the UEs and the paging load.

According to 3GPP TS 36.304, a UE is assigned a paging narrowband by the following equation, where Nn=paging-narrowBands:

$$PNB=\text{floor}(UE\_ID/(N*Ns)) \bmod Nn. \qquad (4)$$

Further, the number of narrowbands, Nn, that can be supported by a certain system bandwidth is given by the table below:

| System BW (MHz) | #PRBs | Fixed # narrowbands |
|---|---|---|
| 1.4 | 6 | 1 |
| 3 | 15 | 2 |
| 5 | 25 | 4 |
| 10 | 50 | 8 |
| 15 | 75 | 12 |
| 20 | 100 | 16 |

In RRC_IDLE state, a UE monitors PDCCH (e.g., legacy PDCCH, MPDCCH, or NPDCCH, according to capabilities) periodically for scheduling of paging requests to be subsequently transmitted on PDSCH. In RRC_CONNECTED state, a UE monitors PDCCH for UL/DL data scheduling on PDSCH/PUSCH as well as for other purposes. In between these monitoring occasions, the UE goes to sleep to reduce energy consumption. This sleep-wake cycle is known as "discontinuous reception" or DRX. The amount of UE power savings is related to wake period ("DRX ON") duration as a fraction of the entire DRX duty cycle.

Depending on DRX setting, a UE may spend a substantial part of its stored energy on decoding PDCCH without detecting a PDSCH/PUSCH scheduled for it. In Rel-15, the wake-up signal (WUS) was introduced in order to reduce UE power consumption. WUS are short in duration due to very small information content, so that WUS monitoring consumes less UE energy than monitoring (M/N)PDCCH for pages. A WUS is transmitted only when any of the UEs sharing an associated PO is/are being paged, and only in the carrier (or narrowband for LTE-M) where the UE(s) is/are being paged.

Figure 4:
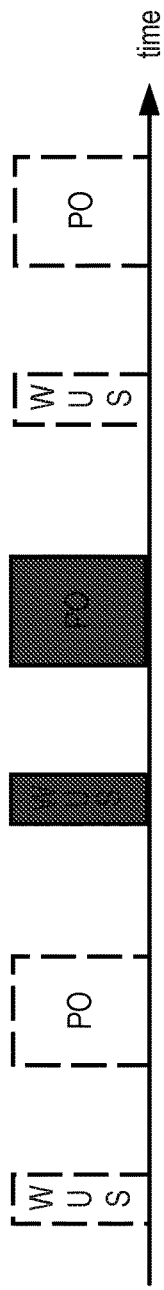
FIG. 4 shows an exemplary timeline that illustrates an association between wake-up signals (WUS) and paging occasions (PO) in LTE.

In other words, a WUS is a short duration signal that indicates to a UE that it should continue to decode a DL control channel that is associated with the WUS, e.g., NPDCCH for NB-IoT UEs, MPDCCH for eMTC UEs, PDCCH for legacy UEs. If such signal is not transmitted (or if the UE does not detect it), then the UE can go back to sleep without decoding the (N/M)PDCCH. FIG. 4 shows an exemplary timeline that illustrates the association between WUS and subsequent (N/M)PDCCH, which is indicated as a PO. Note that solid lines indicate actual WUS/PO positions, while the dashed lines indicate positions of possible WUS/PO that were not transmitted (e.g., due to no paging of the UE). In this manner, WUS can be thought of as a discontinuous transmission (DTX).

The decoding time for a WUS is considerably shorter than that of the full NPDCCH because WUS only needs to contain one bit of information, while NPDCCH may contain up to 35 bits of information. This reduced decoding results in reduced UE energy consumption and longer UE battery life. The sleep time between actual WUS also improves these aspects of UE performance.

Put differently, for the same channel and same missed detection rate, it is possible to transmit a shorter WUS compared to the PDCCH since the WUS carries less information. The shorter WUS requires the UE's receiver to be turned on for less time and facilitates faster UE baseband processing, both of which reduce UE energy consumption. In some cases, a UE may include a dedicated, low-complexity receiver for the WUS. The primary receiver will only be turned on (e.g., to decode PDCCH based on an indication that the dedicated receiver has detected a WUS. This arrangement can facilitate the UE remaining in deep sleep state for long durations with very low energy consumption.

The Rel-15 WUS was designed such that all UEs belongs to the same group. That is, a transmitted WUS associated with a specific PO (e.g., in a PDCCH) may wake-up all UEs that are configured to detect paging at that PO. This means that all UEs that are not targeted by the page will wake up unnecessarily, leading to increased energy consumption.

Both eMTC and NB-IoT have been developed with varying applications that include widely different use cases in terms of paging rates, latency, baseband processing power etc. For example, a power switch for streetlights may only be paged once daily, while a machine controller device may be paged every second. As such, grouping both of these UEs into a single paging group can significantly affect the respective use cases.

Figure 3:
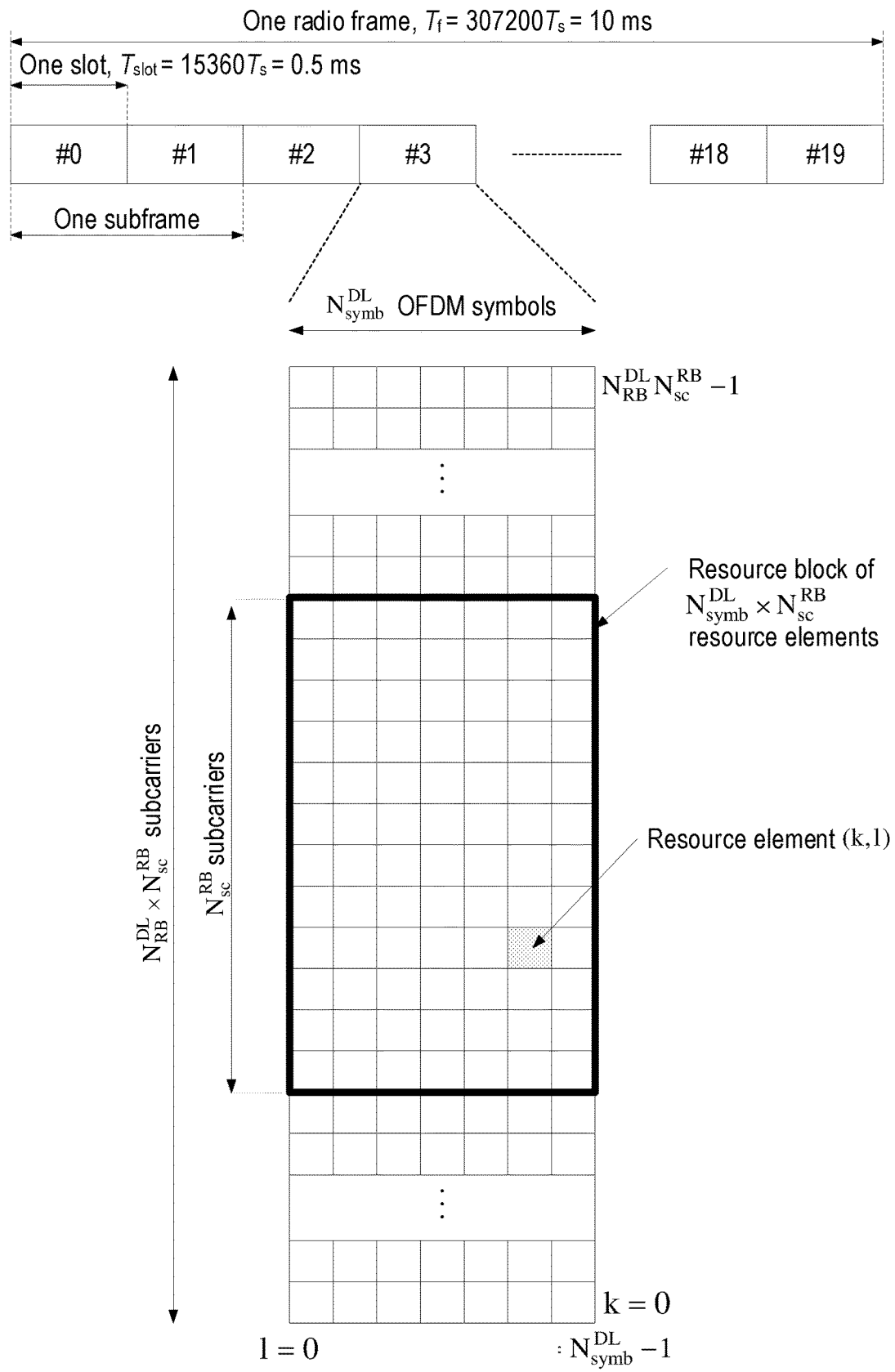
FIG. 3 is a block diagram of an exemplary downlink LTE radio frame structure used for frequency division duplexing (FDD) operation.

Three different WUS gaps were introduced in Rel-15—DRX, short eDRX, and long eDRX—such that in practice there are three time-multiplexed WUS groups even in Rel-15. Each WUS gap is associated with a single WUS resource. In general, a "WUS resource" can refer to a particular time-frequency resource (e.g., within the grid shown in FIG. 3) that is assigned to carry a WUS.

In Rel-16, however, it was agreed to include explicit UE grouping, such that the number of UEs that are sensitive to a WUS transmitted in a particular PO and WUS gap is less than the total number of UEs that share the particular PO and WUS gap. More specifically, multiple WUS sequences were defined such that each WUS indicates that only part of the UEs sharing a WUS gap and a PO are being paged.

This group WUS feature (also referred to as GWUS) is intended to improve DL transmission efficiency and/or reduce UE energy consumption. From a UE perspective, the GWUS reduces false paging, i.e., the risk that the UE is unnecessarily awakened when another UE is being paged. This is achieved by introducing more WUS sequences such that UEs only wake up for paging detection based on detecting their assigned WUS sequence.

One problem is that Rel-16 UEs cannot be awakened by the Rel-15 WUS signal, and the Rel-16 GWUS cannot be altered in order to be backwards compatible. Furthermore, there can be Rel-16 UEs that do not support either WUS or GWUS since support for either of these features is optional. It was initially agreed in 3GPP that the Rel-16 WUS UE grouping should be based on at least UE_ID. Further agreements have been made for WUS UE grouping based on paging probability.

It was also agreed within 3GPP that if a WUS resource is configured to be shared by Rel-15 WUS (i.e., not supporting WUS grouping) and Rel-16 WUS (i.e., supporting WUS grouping), a common WUS for all the group WUS UEs in the same WUS resource can be configured to be a legacy WUS (e.g., Rel-15) or a non-legacy WUS (e.g., Rel-16 GWUS). Put differently, if a group WUS resource is configured to be shared by Rel-15 WUS and Rel-16 WUS, the common WUS sequence for all the group WUS UEs assigned to the same WUS resource can be configured to be the Rel-15 WUS sequence or a Rel-16 WUS sequence. In addition, it was agreed that the maximum number of UE groups per WUS resource is eight (8).

Figure 5:
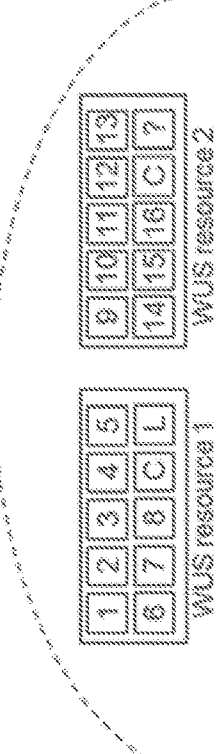
FIG. 5 illustrates an exemplary relationship between paging probability (PP) classes, WUS resources, and UE WUS grouping for LTE-M.
Figure 5:
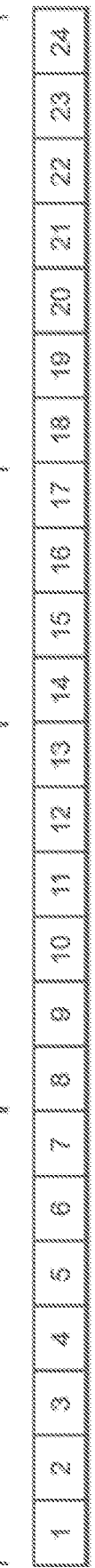
Figure 6:
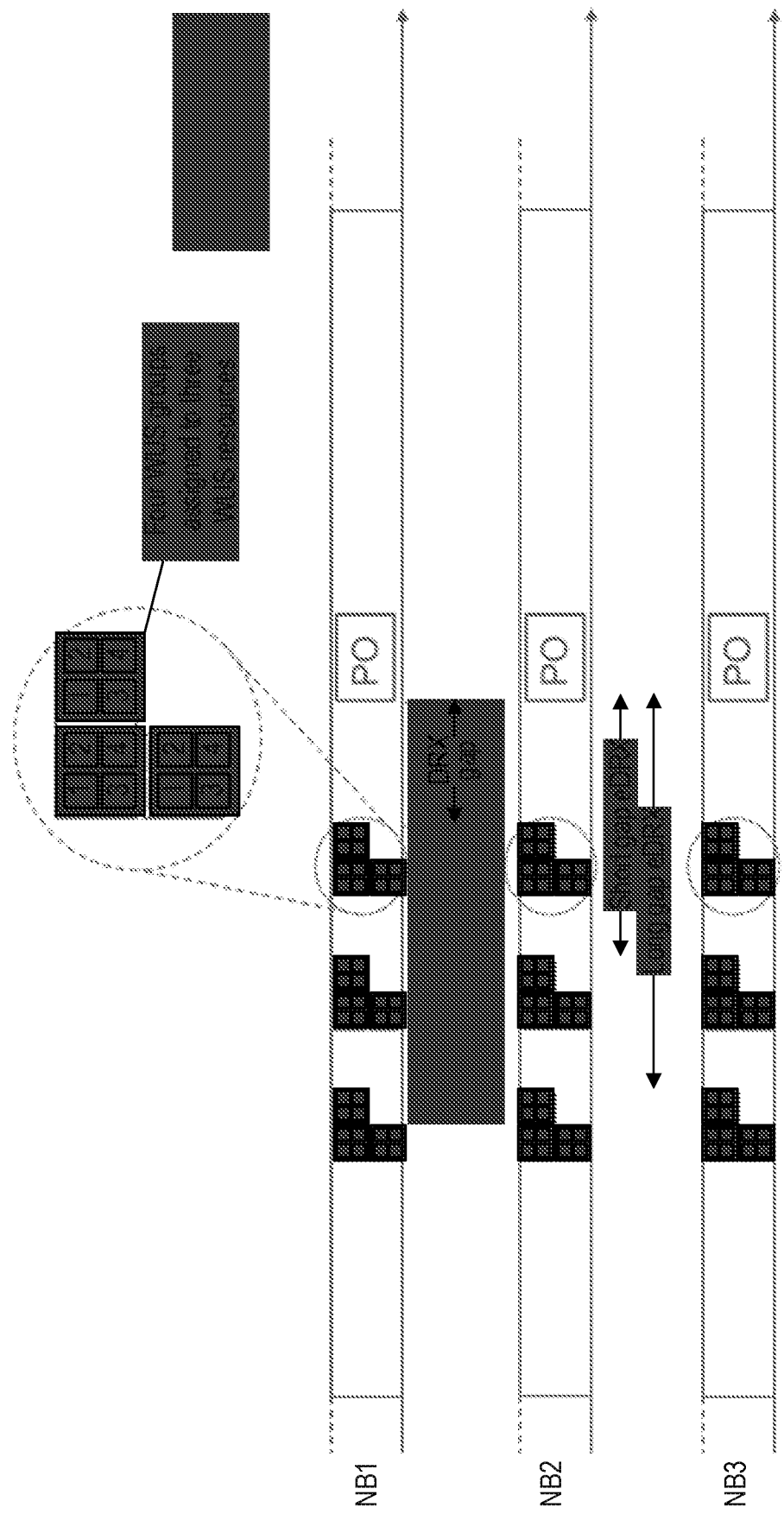
FIG. 6 illustrates an exemplary LTE-M paging arrangement of four WUS groups assigned to three WUS resources that occur in three different paging narrowbands.

FIG. 5 illustrates an exemplary relationship between PP classes, WUS resources, and UE WUS groups for LTE-M. As mentioned above, in Rel-15 the UE is configured with one of three WUS gap lengths (e.g., DRX, short eDRX, or long eDRX) with one WUS resource for each gap length. In Rel-16, up to four (4) different WUS resources can be configured for each WUS gap length in LTE-M (maximum two for NB-IoT), including the shared legacy WUS sequence. Three are configured in FIG. 5 and are labelled WUS resource 1, 2, and 3. FIG. 6 illustrates an LTE-M paging arrangement of four WUS groups assigned to three WUS resources that occur in three different paging narrowbands. In addition, the three WUS resources occur in three different WUS gap lengths, i.e., DRX gap, short eDRX gap, and long eDRX gap.

Furthermore, FIG. 5 shows 24 WUS groups (labelled 1-24) divided into four PP classes: low, medium, high, and unassigned. For example, UEs configured as PP class low can be placed in any of groups 1-7, UEs configured as PP class medium can be placed in any of groups 8-13, etc. In Rel-16, up to eight (8) WUS groups can be assigned to any WUS resource. For example, WUS groups 1-8 are assigned to WUS resource 1 in FIG. 5. In addition, a WUS resource can carry a WUS (e.g., a sequence) for Rel-15 legacy UEs (labelled "L" in WUS resource 1) and a Rel-16 common WUS (labelled "C"). In other words, each WUS resource can carry up to 10 different WUS (e.g., 10 different sequences).

As discussed above, it was agreed that the Rel-15 legacy WUS ("L") can be configured as the common WUS ("C") for Rel-16 GWUS UEs. If applied to the arrangement shown in FIG. 5, all UEs in WUS resource 1 will be awakened unnecessarily each time a Rel-15 UEs is paged. Depending on the number or Rel-15 WUS UEs in the cell and their paging frequency, this arrangement can significantly increase the false paging of GWUS UEs in WUS resource 1, thereby reducing the performance gains of the Rel-16 GWUS feature as compared to legacy Rel-15 WUS.

However, these performance reductions may not be experienced equally by UEs in all groups assigned to the three different WUS resources. For example, in FIG. 5, UEs in groups assigned to WUS resources 2 and 3 may not experience the same performance reduction as UEs in groups assigned to WUS resource 1. To counteract this unfairness among UEs, it was agreed that the 3GPP specifications will support configurability to enable a UE WUS group to alternate between or among WUS resources. This is intended to spread false paging issues more evenly among all Rel-16 GWUS UEs operating in a network or cell.

Even so, exemplary embodiments of the present disclosure are based on Applicant's recognition that, in order for this alternation approach to provide the desired benefits, it must be configured such that the DRX cycle of all UEs are not even multipliers of an alternation period ($P_{alt}$). Otherwise, a UE may repeatedly select the same GWUS resource, thereby frustrating the goals of the alternation approach.

For example, assume two GWUS resources are alternated with $P_{alt}$=2.56 s (i.e., the duration between successive uses of the same GWUS resource). A UE with a DRX period of 2.56 s will only wake up at every second alternation state and, hence, always uses the same GWUS resource. In order to prevent such undesirable behavior, the relation between the alternation period ($P_{alt}$) and the maximum DRX period ($DRX_{max}$) must be such that $DRX_{max}$ is less or equal to the alternation period divided by the number of WUS resources or alternation states, $N_{WUS}$, as expressed below:

$$DRX_{max} \le \frac{P_{alt}}{N_{WUS}} \quad (5)$$

It is here assumed that UEs in eDRX will have a paging time window (PTW) at least as long as the alternation period multiplied with the number of GWUS resources, i.e., $PTW \ge P_{alt} \cdot N_{WUS}$.

Embodiments of the present disclosure address these and other issues, drawbacks, and/or problems by providing flexible mechanisms for rotating the WUS resource index used for WUS UE group selection as a function of various DRX parameters (e.g., system frame number (SFN) or hyper-SFN (HSFN), DRX cycle length (T), etc.) and the number of WUS resources configured ($N_{WUS}$). Various embodiments disclosed herein are based on the requirement expressed in (5) above. For example, such embodiments achieve fairness among UEs in case a Rel-15 legacy WUS is used as the common WUS for Rel-16 GWUS operation.

In some embodiments, the WUS resource index used for WUS UE group selection is rotated and different from the WUS resource index used for configuration. In general, the WUS resource index used for WUS UE group selection ($WUS_{index}^{UE\ group}$) is determined as a function of the WUS resource index used for configuration ($WUS_{index}$), SFN, HSFN, DRX cycle (T), the number of configured WUS resources ($N_{WUS}$), etc. as expressed in equation (6) below:

$$WUS_{index}^{UE\ group} = \text{function}(WUS_{index}, SFN, HSFN, T, N_{WUS}, \ldots). \quad (6)$$

In some embodiments, the WUS resource index used for group selection is rotated depending on the particular DRX wake-up opportunity within the HSFN period (e.g. 1024 SFNs), as expressed in (7) below:

$$WUS_{index}^{UE\ group} = \left(WUS_{index} + div\left(\frac{HSFN}{T}\right)\right) \text{modulo}(N_{WUS}). \quad (7)$$

In (7) above, the function div(x/y) can represent the integer portion of the real-valued quotient of integers x and y, which can be obtained by rounding the real-valued quotient to the next lowest integer value. In (7) above and (8)-(9) below, the modulo function is defined to produce a result in the range $1 \ldots N_{WUS}$ according to the indexing of WUS resources in that range, as discussed above. For example, ($N_{WUS}$+1) modulo ($N_{WUS}$)=1. However, skilled persons will understand that the modulo function could also be defined in a conventional way to produce a result in the range $0 \ldots N_{WUS}-1$, if $WUS_{index}$ and $WUS_{index}^{UE\ group}$ were instead indexed over that range.

As an example of applying (7) for $N_{WUS}$=3 configured WUS resources, if $WUS_{index}$=2 was previously configured and it is the UE's first DRX wake-up occasion within a HSFN period, then the UE will select $WUS_{index}^{UE\ group}$ 3 when it determines the WUS UE group. But in the second DRX wake-up occasion of the HSFN, the UE will instead select $WUS_{index}^{UE\ group}$=1 when it determines the WUS UE group. In this manner, the UE uses different WUS resources each DRX wake-up occasion, e.g., on an alternating basis or rotation.

One benefit of basing the selection in (7) on HSFN is that it works also for UEs configured with DRX cycle of 10.24 sec or, equivalently, 1024 radio frames, which is equal to the SFN period. One benefit of rotating as a function of the DRX cycle length, T, is to ensure a rotation does occur, as illustrated in more detail below.

In other embodiments, the WUS resource index could be rotated based on SFN rather than HSFN, as expressed in (8) below:

$$WUS_{index}^{UE\ group} = (WUS_{index} + SFN) \text{ modulo } (N_{WUS}). \quad (8)$$

Even so, the UE only uses the WUS resource index for WUS UE group determination whenever it is being paged. In other words, the UE only evaluates (8) for radio frame=N*T, where N is an integer and T is the DRX cycle. For example, if the UE DRX cycle is 2.56 sec (i.e.,256 radio frames) and $N_{WUS}=2$, the UE will only evaluate (8) for SFN={0, 256, 512, 756, 1024, . . . }, each of which produces the same result such that there is no rotation when $N_{WUS}=2$. Embodiments based on (8) will result in rotation and/or alternation among the WUS resources for $N_{WUS}=3$.

In some embodiments, in order to address and/or mitigate these issues, it is possible to scale the SFN based on the necessary relation between the $DRX_{max}$ and the alternation periodicity, $P_{alt}$. An example of such embodiments is illustrated by equation (9) below:

$$WUS_{index}^{UE\ group} = \left( WUS_{index} + \left\lfloor \frac{DRX_{max}}{P_{alt}} SFN \right\rfloor \right) \text{modulo}(N_{WUS}), \quad (9)$$

where $\lfloor \cdot \rfloor$ (i.e., floor function) rounds to the next lower integer, which can have an effect of limiting the alternation to occur at a sufficiently low frequency. Other expressions and rounding operations can also be used to produce similar or different effects. In other embodiments, a constant term can be used in an expression similar to (9) to ensure a rotation in UE selection of $WUS_{index}^{UE\ group}$ considering the maximum LTE DRX period of 10.28 sec and $N_{WUS} \le 4$.

Figure 7:
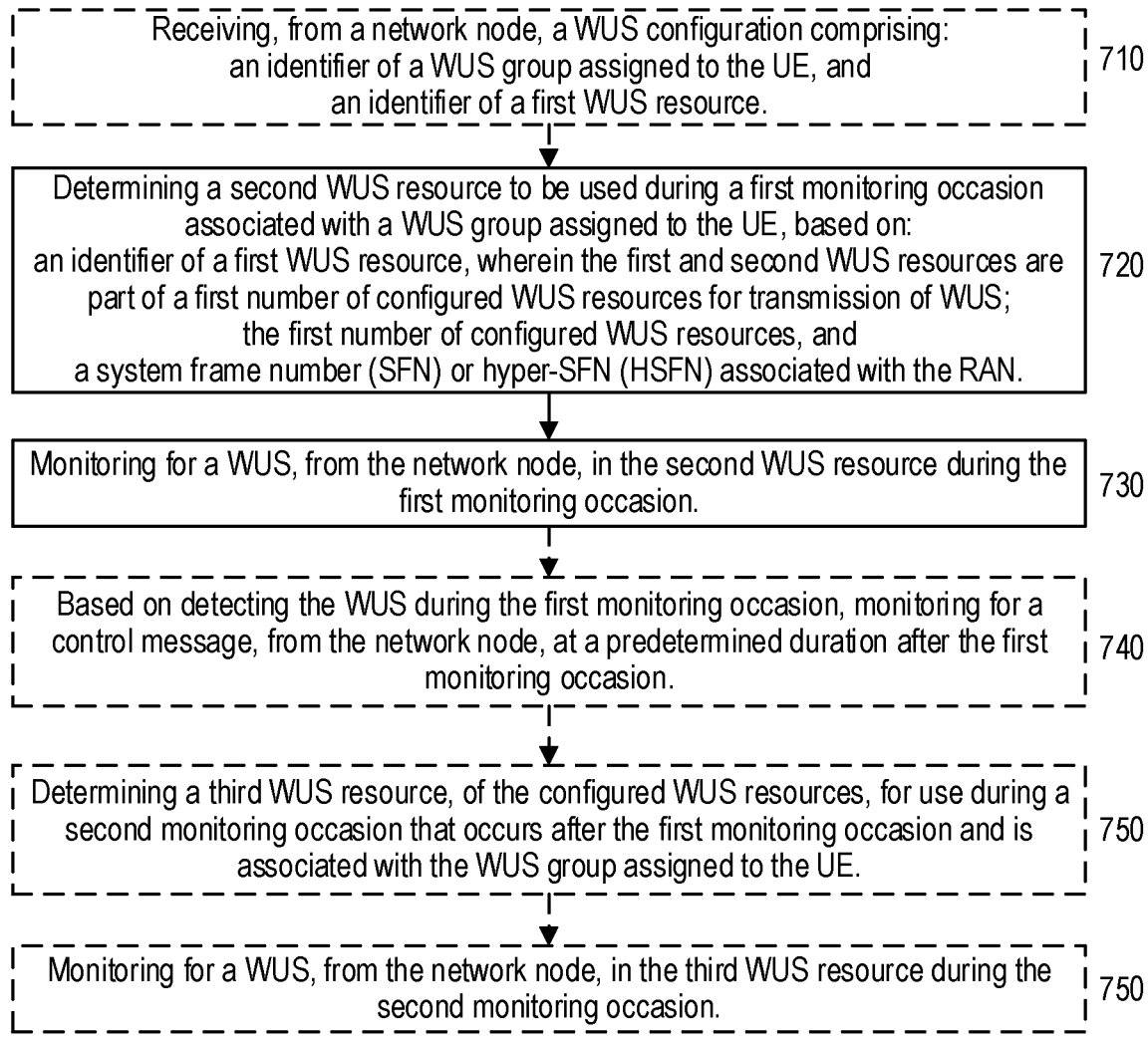
FIG. 7 is a flow diagram illustrating exemplary methods (e.g., procedures) for a user equipment (UE, e.g., wireless device, IoT device, MTC device, etc. or component(s) thereof), according to various exemplary embodiments of the present disclosure.
Figure 8:
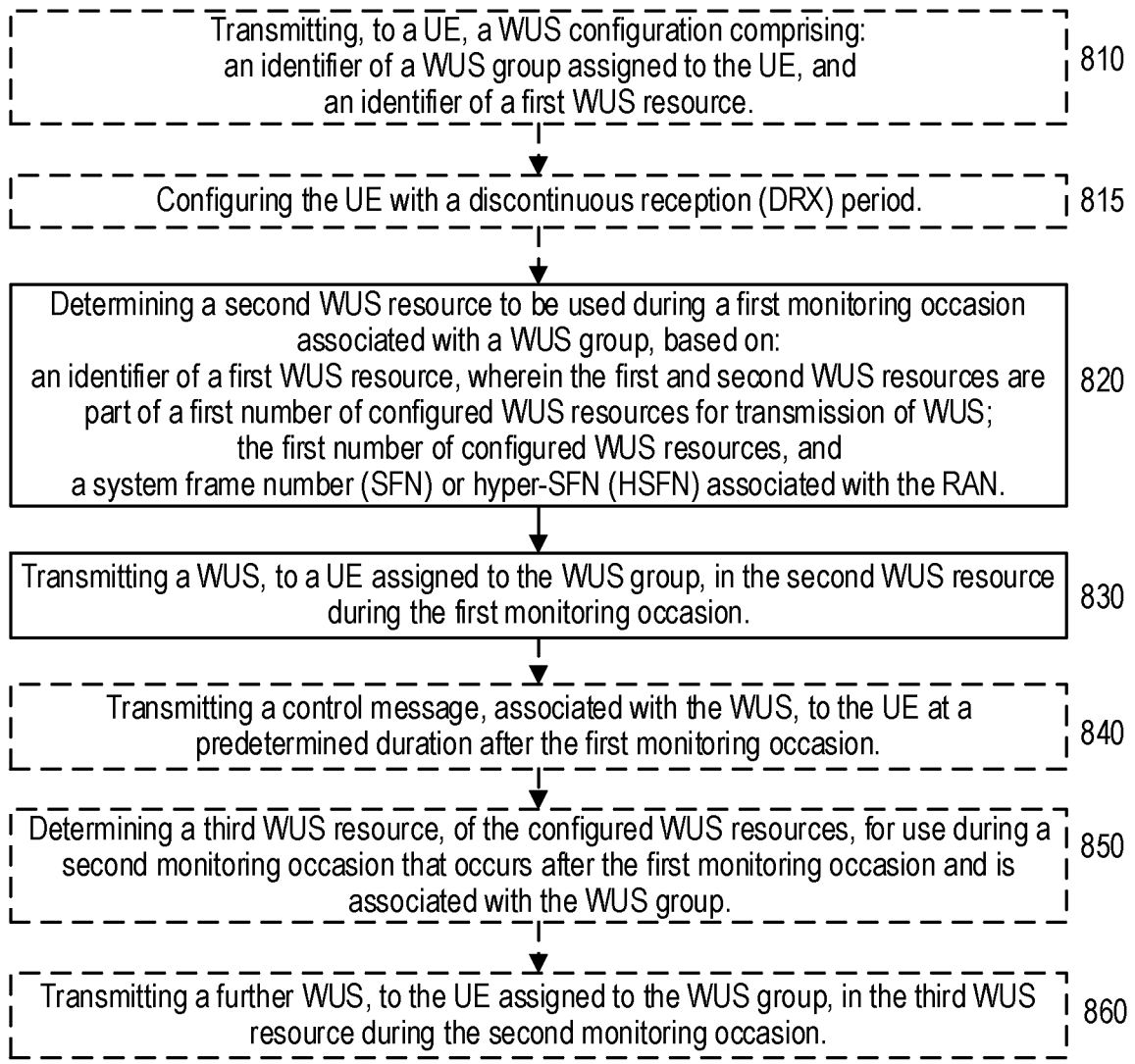
FIG. 8 is a flow diagram illustrating exemplary methods (e.g., procedures) for a network node (e.g., base station, eNB, gNB, ng-eNB, etc. or component(s) thereof), according to various exemplary embodiments of the present disclosure.

These embodiments briefly described above can be further illustrated with reference to FIGS. 7-8, which depict exemplary methods (e.g., procedures) for a UE and a network node, respectively. Put differently, various features of the operations described below correspond to various embodiments described above. Furthermore, the exemplary methods shown in FIGS. 7-8 can be used cooperatively to provide various exemplary benefits described herein. Although FIGS. 7-8 shows blocks specific blocks in particular orders, the operations of the exemplary methods can be performed in different orders than shown and can be combined and/or divided into blocks having different functionality than shown. Optional blocks or operations are indicated by dashed lines.

More specifically, FIG. 7 is a flow diagram illustrating an exemplary method (e.g., procedure) for receiving wake-up signals (WUS) transmitted by a network node in a radio access network (RAN), according to various exemplary embodiments of the present disclosure. The exemplary method can be performed by a user equipment (UE, e.g., wireless device, IoT device, MTC device, etc. or component thereof) configured to operate in the RAN, such as described herein with reference to other figures.

The exemplary method illustrated by FIG. 7 can include the operations of block 720, in which the UE can determine a second WUS resource for use during a first monitoring occasion associated with a WUS group assigned to the UE. Determining the second WUS resource can be based on an identifier of a first WUS resource, wherein the first and second WUS resources are part of a first number of configured WUS resources for transmission of WUS. Determining the second WUS resource can also be based on the first number of configured WUS resources (e.g., $N_{WUS}$ discussed above) and a system frame number (SFN) or hyper-SFN (HSFN) associated with the RAN.

The exemplary method can also include the operations of block 730, in which the UE can monitor for a WUS, from the network node, in the second WUS resource during the first monitoring occasion. For example, this monitoring can be done in the manner described above in relation to FIG. 4.

In some embodiments, the second WUS resource can be different from the first WUS resource (i.e., the configured WUS resource). This is an example of the WUS resource alternation or rotation, discussed above. In some embodiments, the first number of configured WUS resources can be greater than two.

In some embodiments, the UE can be configured with a discontinuous reception (DRX) period. In such embodiments, the DRX period can be less than or equal to a WUS resource alternation period (Palt) divided by the first number of configured WUS resources. This relation is exemplified by equation (5), discussed above.

In some embodiments, the exemplary method can also include the operations of block 710, in which the UE can receive, from the network node, a WUS configuration that includes an identifier of the WUS group assigned to the UE, and the identifier of the first WUS resource (e.g., WUSindex discussed above) associated with the assigned WUS group. In some embodiments, the identifier of the first WUS resource can be based on an identifier of the UE (e.g., UEID, based on the UE's IMSI, as discussed above).

In some embodiments, the exemplary method can also include the operations of block 740, where the UE can, based on detecting the WUS during the first monitoring occasion, (e.g., in block 730), monitor for a control message from the network node at a predetermined duration after the first monitoring occasion. For example, the control message can be a scheduling PDCCH (e.g., DCI), as discussed above.

In some embodiments, the exemplary method can also include the operations of blocks 750-760. In block 750, the UE can determine a third resource, of the configured WUS resources, to be used during a second monitoring occasion that occurs after the first monitoring occasion and is associated with the WUS group assigned to the UE. In block 760, the UE can monitor for a WUS, from the network node, in the third WUS resource during the second monitoring occasion.

In some of these embodiments, the second monitoring occasion can be the next subsequent monitoring occasion that is associated with the assigned WUS group. In such case, the third resource can be different from the second resource. In some variants, the third resource can also be different from the first resource. In this manner, a rotation or alternation among WUS resources can be provided.

In other of these embodiments, the second monitoring occasion can be a WUS resource alternation period (Palt) after the first monitoring occasion. In such case, the third resource can be the same as the second resource.

In various embodiments, the determining operations of block 720 (and block 750, if performed) can be based on any of equations (7), (8), or (9) above. In such embodiments, the following relations can apply:

$WUS_{index}$ is the identifier of the first WUS resource, $WUS_{index}^{UE\ group}$ is the identifier of the second or third WUS resource, T is the UE's DRX period, $N_{WUS}$ is the first number of configured WUS resources, $DRX_{max}$ is the maximum discontinuous reception (DRX) period for the UE, and $P_{alt}$ is the WUS resource alternation period.

Furthermore, FIG. 8 is a flow diagram illustrating an exemplary method (e.g., procedure) for transmitting wake-up signals (WUS) to one or more user equipment (UEs), according to various exemplary embodiments of the present disclosure. The exemplary method shown in FIG. 8 can be performed by a network node (e.g., eNB, gNB, or components thereof) of a radio access network (RAN, e.g., E-UTRAN, NG-RAN, etc.), such as described herein with reference to other figures.

The exemplary method can also include the operations of block 820, in which the network node can determine a second WUS resource for use during a first monitoring occasion associated with a WUS group. Determining the second WUS resource can be based on the identifier of the first WUS resource, the first number of configured WUS resources, and a system frame number (SFN) or hyper-SFN (HSFN) associated with the RAN. In some embodiments (e.g., in some determinations), the second WUS resource can be different from the first WUS resource (i.e., the configured WUS resource).

The exemplary method can also include the operations of block 830, in which the network node can transmit a WUS, to a UE assigned to the WUS group, in the second WUS resource during the first monitoring occasion.

In some embodiments, the second WUS resource can be different from the first WUS resource. This is an example of the WUS resource alternation or rotation, discussed above. In some embodiments, the first number of configured WUS resources can be greater than two.

In some embodiments, the exemplary method can also include the operations of block 815, in which the network node can configure the UE with a discontinuous reception (DRX) period. In such embodiments, the DRX period can be less than or equal to a WUS resource alternation period (Palt) divided by the first number of configured WUS resources. This relation is exemplified by equation (5), discussed above.

In some embodiments, the exemplary method can also include the operations of block 810, in which the network node can transmit, to the UE, a WUS configuration that includes an identifier of the WUS group assigned to the UE, and the identifier of the first WUS resource (e.g., WUSindex discussed above) associated with the assigned WUS group. In some embodiments, the identifier of the first WUS resource can be based on an identifier of the UE (e.g., UEID based on the UE's IMSI, as discussed above).

In some embodiments, the WUS (e.g., transmitted in block 830) can be associated with a control message pending for the UE before the first monitoring occasion. In such embodiments, the exemplary method can also include the operations of block 840, where the network node can transmit the control message to the UE at a predetermined duration after the first monitoring occasion. For example, the control message can be a scheduling PDCCH (e.g., DCI), as discussed above.

In some embodiments, the exemplary method can also include the operations of blocks 850-860. In block 850, the network node can determine a third resource, of the configured WUS resources, to be used during a second monitoring occasion that occurs after the first monitoring occasion and is associated with the WUS group. In block 860, the network node can transmit a further WUS, to the UE assigned to the WUS group, in the third WUS resource during the second monitoring occasion.

In some of these embodiments, the second monitoring occasion can be the next subsequent monitoring occasion that is associated with the assigned WUS group. In such case, the third resource can be different from the second resource. In some variants, the third resource can also be different from the first resource. In this manner, a rotation or alternation among WUS resources can be provided.

In other of these embodiments, the second monitoring occasion can be a WUS resource alternation period (Palt) after the first monitoring occasion. In such case, the third resource can be the same as the second resource.

In various embodiments, the determining operations of block 820 (and block 850, if performed) can be based on any of equations (7), (8), or (9) above. In such embodiments, the following relations can apply:

$WUS_{index}$ is the identifier of the first WUS resource, $WUS_{index}^{UE\ group}$ is the identifier of the second or third WUS resource, T is the UE's DRX period, $N_{WUS}$ is the first number of configured WUS resources, $DRX_{max}$ is the maximum discontinuous reception (DRX) period for the UE, and $P_{alt}$ is the WUS resource alternation period.

Figure 9:
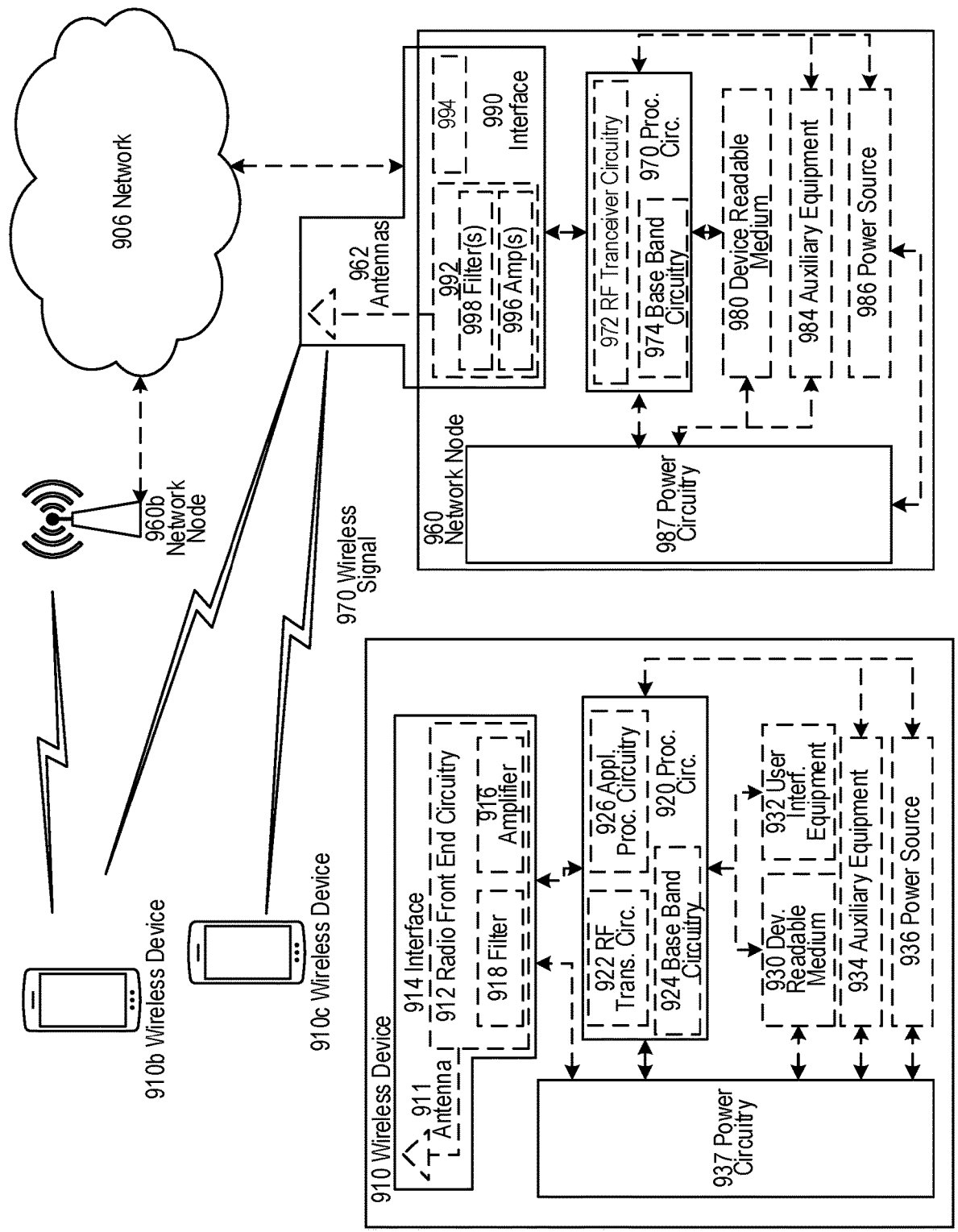
FIG. 9 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network can further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMES, SGWs, AMFs, etc.), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 can represent a device that includes the illustrated combination of hardware components, other embodiments can comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node can comprise multiple different physical components that make up a single illustrated component (e.g., device readable medium 980 can comprise multiple separate hard drives as well as multiple RAM modules).

Similarly, network node 960 can be composed of multiple physically separate components (e.g., a NodeB component and an RNC component, or a BTS component and a BSC component, etc.), which can each have their own respective components. In certain scenarios in which network node 960 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 960 can be configured to support multiple radio access technologies (RATs). In such embodiments, some components can be duplicated (e.g., separate device readable medium 980 for the different RATs) and some components can be reused (e.g., the same antenna 962 can be shared by the RATs). Network node 960 can also include multiple sets of the various illustrated components for different wireless technologies integrated into network node 960, such as, for example, GSM, WCDMA, LTE, NR, WiFi, or Bluetooth wireless technologies. These wireless technologies can be integrated into the same or different chip or set of chips and other components within network node 960.

Processing circuitry 970 can be configured to perform any determining, calculating, or similar operations (e.g., certain obtaining operations) described herein as being provided by a network node. These operations performed by processing circuitry 970 can include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 960, either alone or in conjunction with other network node 960 components (e.g., device readable medium 980). Such functionality can include any of the various wireless features, functions, or benefits discussed herein.

For example, processing circuitry 970 can execute instructions stored in device readable medium 980 or in memory within processing circuitry 970. In some embodiments, processing circuitry 970 can include a system on a chip (SOC). As a more specific example, instructions (also referred to as a computer program product) stored in medium 980 can include instructions that, when executed by processing circuitry 970, can configure network node 960 to perform operations corresponding to various exemplary methods (e.g., procedures) described herein.

In some embodiments, processing circuitry 970 can include one or more of radio frequency (RF) transceiver circuitry 972 and baseband processing circuitry 974. In some embodiments, radio frequency (RF) transceiver circuitry 972 and baseband processing circuitry 974 can be on separate chips (or sets of chips), boards, or units, such as radio units and digital units. In alternative embodiments, part or all of RF transceiver circuitry 972 and baseband processing circuitry 974 can be on the same chip or set of chips, boards, or units In certain embodiments, some or all of the functionality described herein as being provided by a network node, base station, eNB or other such network device can be performed by processing circuitry 970 executing instructions stored on device readable medium 980 or memory within processing circuitry 970. In alternative embodiments, some or all of the functionality can be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960 but are enjoyed by network node 960 as a whole, and/or by end users and the wireless network generally.

Device readable medium 980 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 970. Device readable medium 980 can store any suitable instructions, data or information, including a computer program, software, an application including one or more of logic, rules, code, tables, etc. and/or other instructions capable of being executed by processing circuitry 970 and, utilized by network node 960. Device readable medium 980 can be used to store any calculations made by processing circuitry 970 and/or any data received via interface 990. In some embodiments, processing circuitry 970 and device readable medium 980 can be considered to be integrated.

Interface 990 is used in the wired or wireless communication of signaling and/or data between network node 960, network 906, and/or WDs 910. As illustrated, interface 990 comprises port(s)/terminal(s) 994 to communicate data, for example, to and from network 906 over a wired connection. Interface 990 also includes radio front end circuitry 992 that can be coupled to, or in certain embodiments a part of, antenna 962. Radio front end circuitry 992 comprises filters 998 and amplifiers 996. Radio front end circuitry 992 can be connected to antenna 962 and processing circuitry 970. Radio front end circuitry can be configured to condition signals communicated between antenna 962 and processing circuitry 970. Radio front end circuitry 992 can receive digital data that is to be sent out to other network nodes or WDs via a wireless connection. Radio front end circuitry 992 can convert the digital data into a radio signal having the appropriate channel and bandwidth parameters using a combination of filters 998 and/or amplifiers 996. The radio signal can then be transmitted via antenna 962. Similarly, when receiving data, antenna 962 can collect radio signals which are then converted into digital data by radio front end circuitry 992. The digital data can be passed to processing circuitry 970. In other embodiments, the interface can comprise different components and/or different combinations of components.

In certain alternative embodiments, network node 960 may not include separate radio front end circuitry 992, instead, processing circuitry 970 can comprise radio front end circuitry and can be connected to antenna 962 without separate radio front end circuitry 992. Similarly, in some embodiments, all or some of RF transceiver circuitry 972 can be considered a part of interface 990. In still other embodiments, interface 990 can include one or more ports or terminals 994, radio front end circuitry 992, and RF transceiver circuitry 972, as part of a radio unit (not shown), and interface 990 can communicate with baseband processing circuitry 974, which is part of a digital unit (not shown).

Antenna 962 can include one or more antennas, or antenna arrays, configured to send and/or receive wireless signals. Antenna 962 can be coupled to radio front end circuitry 990 and can be any type of antenna capable of transmitting and receiving data and/or signals wirelessly. In some embodiments, antenna 962 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 962 can be separate from network node 960 and can be connectable to network node 960 through an interface or port.

Antenna 962, interface 990, and/or processing circuitry 970 can be configured to perform any receiving operations and/or certain obtaining operations described herein as being performed by a network node. Any information, data and/or signals can be received from a wireless device, another network node and/or any other network equipment. Similarly, antenna 962, interface 990, and/or processing circuitry 970 can be configured to perform any transmitting operations described herein as being performed by a network node. Any information, data and/or signals can be transmitted to a wireless device, another network node and/or any other network equipment.

Power circuitry 987 can comprise, or be coupled to, power management circuitry and can be configured to supply the components of network node 960 with power for performing the functionality described herein. Power circuitry 987 can receive power from power source 986. Power source 986 and/or power circuitry 987 can be configured to provide power to the various components of network node 960 in a form suitable for the respective components (e.g., at a voltage and current level needed for each respective component). Power source 986 can either be included in, or external to, power circuitry 987 and/or network node 960. For example, network node 960 can be connectable to an external power source (e.g., an electricity outlet) via an input circuitry or interface such as an electrical cable, whereby the external power source supplies power to power circuitry 987. As a further example, power source 986 can comprise a source of power in the form of a battery or battery pack which is connected to, or integrated in, power circuitry 987. The battery can provide backup power should the external power source fail. Other types of power sources, such as photovoltaic devices, can also be used.

Alternative embodiments of network node 960 can include additional components beyond those shown in FIG. 9 that can be responsible for providing certain aspects of the network node's functionality, including any of the functionality described herein and/or any functionality necessary to support the subject matter described herein. For example, network node 960 can include user interface equipment to allow and/or facilitate input of information into network node 960 and to allow and/or facilitate output of information from network node 960. This can allow and/or facilitate a user to perform diagnostic, maintenance, repair, and other administrative functions for network node 960. In some embodiments, a wireless device (WD, e.g., WD 910) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 can include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies can be integrated into the same or different chips or set of chips as other components within WD 910.

Antenna 911 can include one or more antennas or antenna arrays, configured to send and/or receive wireless signals, and is connected to interface 914. In certain alternative embodiments, antenna 911 can be separate from WD 910 and be connectable to WD 910 through an interface or port. Antenna 911, interface 914, and/or processing circuitry 920 can be configured to perform any receiving or transmitting operations described herein as being performed by a WD. Any information, data and/or signals can be received from a network node and/or another WD. In some embodiments, radio front end circuitry and/or antenna 911 can be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920 and can be configured to condition signals communicated between antenna 911 and processing circuitry 920. Radio front end circuitry 912 can be coupled to or a part of antenna 911. In some embodiments, WD 910 may not include separate radio front end circuitry 912; rather, processing circuitry 920 can comprise radio front end circuitry and can be connected to antenna 911. Similarly, in some embodiments, some or all of RF transceiver circuitry 922 can be considered a part of interface 914. Radio front end circuitry 912 can receive digital data that is to be sent out to other network nodes or WDs via a wireless connection. Radio front end circuitry 912 can convert the digital data into a radio signal having the appropriate channel and bandwidth parameters using a combination of filters 918 and/or amplifiers 916. The radio signal can then be transmitted via antenna 911. Similarly, when receiving data, antenna 911 can collect radio signals which are then converted into digital data by radio front end circuitry 912. The digital data can be passed to processing circuitry 920. In other embodiments, the interface can comprise different components and/or different combinations of components.

Processing circuitry 920 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 910 functionality either alone or in combination with other WD 910 components, such as device readable medium 930. Such functionality can include any of the various wireless features or benefits discussed herein.

For example, processing circuitry 920 can execute instructions stored in device readable medium 930 or in memory within processing circuitry 920 to provide the functionality disclosed herein. More specifically, instructions (also referred to as a computer program product) stored in medium 930 can include instructions that, when executed by processor 920, can configure wireless device 910 to perform operations corresponding to various exemplary methods (e.g., procedures) described herein.

As illustrated, processing circuitry 920 includes one or more of RF transceiver circuitry 922, baseband processing circuitry 924, and application processing circuitry 926. In other embodiments, the processing circuitry can comprise different components and/or different combinations of components. In certain embodiments processing circuitry 920 of WD 910 can comprise a SOC. In some embodiments, RF transceiver circuitry 922, baseband processing circuitry 924, and application processing circuitry 926 can be on separate chips or sets of chips. In alternative embodiments, part or all of baseband processing circuitry 924 and application processing circuitry 926 can be combined into one chip or set of chips, and RF transceiver circuitry 922 can be on a separate chip or set of chips. In still alternative embodiments, part or all of RF transceiver circuitry 922 and baseband processing circuitry 924 can be on the same chip or set of chips, and application processing circuitry 926 can be on a separate chip or set of chips. In yet other alternative embodiments, part or all of RF transceiver circuitry 922, baseband processing circuitry 924, and application processing circuitry 926 can be combined in the same chip or set of chips. In some embodiments, RF transceiver circuitry 922 can be a part of interface 914. RF transceiver circuitry 922 can condition RF signals for processing circuitry 920. In certain embodiments, some or all of the functionality described herein as being performed by a WD can be provided by processing circuitry 920 executing instructions stored on device readable medium 930, which in certain embodiments can be a computer-readable storage medium. In alternative embodiments, some or all of the functionality can be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 can be configured to perform any determining, calculating, or similar operations (e.g., certain obtaining operations) described herein as being performed by a WD. These operations, as performed by processing circuitry 920, can include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 can be operable to store a computer program, software, an application including one or more of logic, rules, code, tables, etc. and/or other instructions capable of being executed by processing circuitry 920. Device readable medium 930 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 920. In some embodiments, processing circuitry 920 and device readable medium 930 can be considered to be integrated.

User interface equipment 932 can include components that allow and/or facilitate a human user to interact with WD 910. Such interaction can be of many forms, such as visual, audial, tactile, etc. User interface equipment 932 can be operable to produce output to the user and to allow and/or facilitate the user to provide input to WD 910. The type of interaction can vary depending on the type of user interface equipment 932 installed in WD 910. For example, if WD 910 is a smart phone, the interaction can be via a touch screen; if WD 910 is a smart meter, the interaction can be through a screen that provides usage (e.g., the number of gallons used) or a speaker that provides an audible alert (e.g., if smoke is detected). User interface equipment 932 can include input interfaces, devices and circuits, and output interfaces, devices and circuits. User interface equipment 932 can be configured to allow and/or facilitate input of information into WD 910 and is connected to processing circuitry 920 to allow and/or facilitate processing circuitry 920 to process the input information. User interface equipment 932 can include, for example, a microphone, a proximity or other sensor, keys/buttons, a touch display, one or more cameras, a USB port, or other input circuitry. User interface equipment 932 is also configured to allow and/or facilitate output of information from WD 910, and to allow and/or facilitate processing circuitry 920 to output information from WD 910. User interface equipment 932 can include, for example, a speaker, a display, vibrating circuitry, a USB port, a headphone interface, or other output circuitry. Using one or more input and output interfaces, devices, and circuits, of user interface equipment 932, WD 910 can communicate with end users and/or the wireless network and allow and/or facilitate them to benefit from the functionality described herein.

Auxiliary equipment 934 is operable to provide more specific functionality which may not be generally performed by WDs. This can comprise specialized sensors for doing measurements for various purposes, interfaces for additional types of communication such as wired communications etc. The inclusion and type of components of auxiliary equipment 934 can vary depending on the embodiment and/or scenario.

Power source 936 can, in some embodiments, be in the form of a battery or battery pack. Other types of power sources, such as an external power source (e.g., an electricity outlet), photovoltaic devices or power cells, can also be used. WD 910 can further comprise power circuitry 937 for delivering power from power source 936 to the various parts of WD 910 which need power from power source 936 to carry out any functionality described or indicated herein. Power circuitry 937 can in certain embodiments comprise power management circuitry. Power circuitry 937 can additionally or alternatively be operable to receive power from an external power source; in which case WD 910 can be connectable to the external power source (such as an electricity outlet) via input circuitry or an interface such as an electrical power cable. Power circuitry 937 can also in certain embodiments be operable to deliver power from an external power source to power source 936. This can be, for example, for the charging of power source 936. Power circuitry 937 can perform any converting or other modification to the power from power source 936 to make it suitable for supply to the respective components of WD 910.

Figure 10:
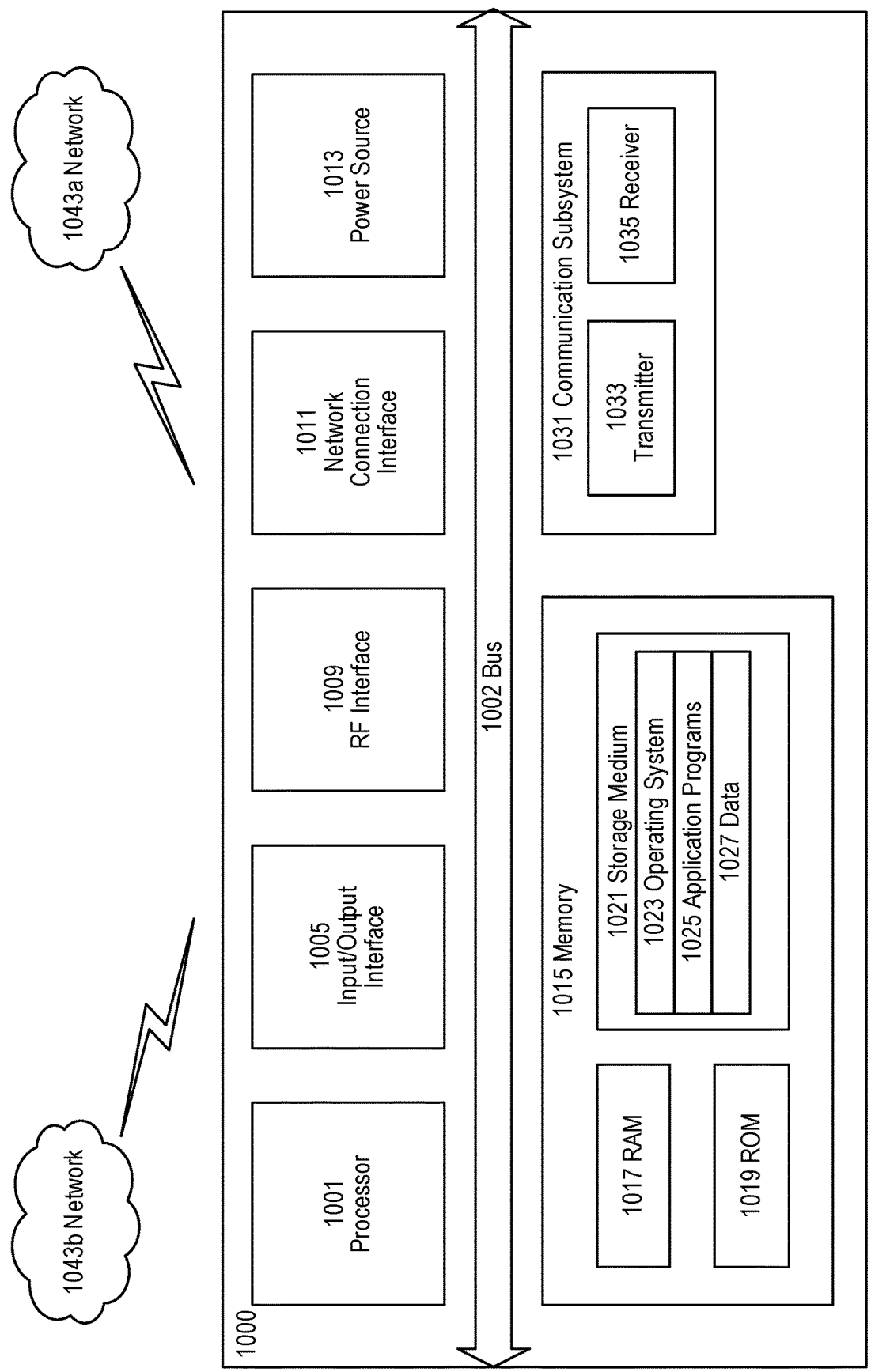
FIG. 10 is a block diagram illustrating an exemplary embodiment of a UE, according to various exemplary embodiments of the present disclosure.

FIG. 10 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 10200 can be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3r^d$ Generation Partnership Project (3GPP), such as 3GPP's GSM, UMTS, LTE, and/or 5G standards. As mentioned previously, the term WD and UE can be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 can include other similar types of information. Certain UEs can utilize all of the components shown in FIG. 10, or only a subset of the components. The level of integration between the components can vary from one UE to another UE. Further, certain UEs can contain multiple instances of a component, such as multiple processors, memories, transceivers, transmitters, receivers, etc.

In FIG. 10, processing circuitry 1001 can be configured to process computer instructions and data. Processing circuitry 1001 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 can include two central processing units (CPUs). Data can be information in a form suitable for use by a computer.

In the depicted embodiment, input/output interface 1005 can be configured to provide a communication interface to an input device, output device, or input and output device. UE 1000 can be configured to use an output device via input/output interface 1005. An output device can use the same type of interface port as an input device. For example, a USB port can be used to provide input to and output from UE 1000. The output device can be a speaker, a sound card, a video card, a display, a monitor, a printer, an actuator, an emitter, a smartcard, another output device, or any combination thereof. UE 1000 can be configured to use an input device via input/output interface 1005 to allow and/or facilitate a user to capture information into UE 1000. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 10, RF interface 1009 can be configured to provide a communication interface to RF components such as a transmitter, a receiver, and an antenna. Network connection interface 1011 can be configured to provide a communication interface to network 1043a. Network 1043a can encompass wired and/or wireless networks such as a local-area network (LAN), a wide-area network (WAN), a computer network, a wireless network, a telecommunications network, another like network or any combination thereof. For example, network 1043a can comprise a Wi-Fi network. Network connection interface 1011 can be configured to include a receiver and a transmitter interface used to communicate with one or more other devices over a communication network according to one or more communication protocols, such as Ethernet, TCP/IP, SONET, ATM, or the like. Network connection interface 1011 can implement receiver and transmitter functionality appropriate to the communication network links (e.g., optical, electrical, and the like). The transmitter and receiver functions can share circuit components, software or firmware, or alternatively can be implemented separately.

RAM 1017 can be configured to interface via bus 1002 to processing circuitry 1001 to provide storage or caching of data or computer instructions during the execution of software programs such as the operating system, application programs, and device drivers. ROM 1019 can be configured to provide computer instructions or data to processing circuitry 1001. For example, ROM 1019 can be configured to store invariant low-level system code or data for basic system functions such as basic input and output (I/O), startup, or reception of keystrokes from a keyboard that are stored in a non-volatile memory. Storage medium 1021 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1021 can be configured to include operating system 1023; application program 1025 such as a web browser application, a widget or gadget engine or another application; and data file 1027. Storage medium 1021 can store, for use by UE 1000, any of a variety of various operating systems or combinations of operating systems. For example, application program 1025 can include executable program instructions (also referred to as a computer program product) that, when executed by processor 1001, can configure UE 1000 to perform operations corresponding to various exemplary methods (e.g., procedures) described herein.

Storage medium 1021 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 can allow and/or facilitate UE 1000 to access computer-executable instructions, application programs or the like, stored on transitory or non-transitory memory media, to off-load data, or to upload data. An article of manufacture, such as one utilizing a communication system can be tangibly embodied in storage medium 1021, which can comprise a device readable medium.

In FIG. 10, processing circuitry 1001 can be configured to communicate with network 1043b using communication subsystem 1031. Network 1043a and network 1043b can be the same network or networks or different network or networks. Communication subsystem 1031 can be configured to include one or more transceivers used to communicate with network 1043b. For example, communication subsystem 1031 can be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver can include transmitter 1033 and/or receiver 1035 to implement transmitter or receiver functionality, respectively, appropriate to the RAN links (e.g., frequency allocations and the like). Further, transmitter 1033 and receiver 1035 of each transceiver can share circuit components, software or firmware, or alternatively can be implemented separately.

In the illustrated embodiment, the communication functions of communication subsystem 1031 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 can include cellular communication, Wi-Fi communication, Bluetooth communication, and GPS communication. Network 1043b can encompass wired and/or wireless networks such as a local-area network (LAN), a wide-area network (WAN), a computer network, a wireless network, a telecommunications network, another like network or any combination thereof. For example, network 1043b can be a cellular network, a Wi-Fi network, and/or a near-field network. Power source 1013 can be configured to provide alternating current (AC) or direct current (DC) power to components of UE 1000.

The features, benefits and/or functions described herein can be implemented in one of the components of UE 1000 or partitioned across multiple components of UE 1000. Further, the features, benefits, and/or functions described herein can be implemented in any combination of hardware, software or firmware. In one example, communication subsystem 1031 can be configured to include any of the components described herein. Further, processing circuitry 1001 can be configured to communicate with any of such components over bus 1002. In another example, any of such components can be represented by program instructions stored in memory that when executed by processing circuitry 1001 perform the corresponding functions described herein. In another example, the functionality of any of such components can be partitioned between processing circuitry 1001 and communication subsystem 1031. In another example, the non-computationally intensive functions of any of such components can be implemented in software or firmware and the computationally intensive functions can be implemented in hardware.

Figure 11:
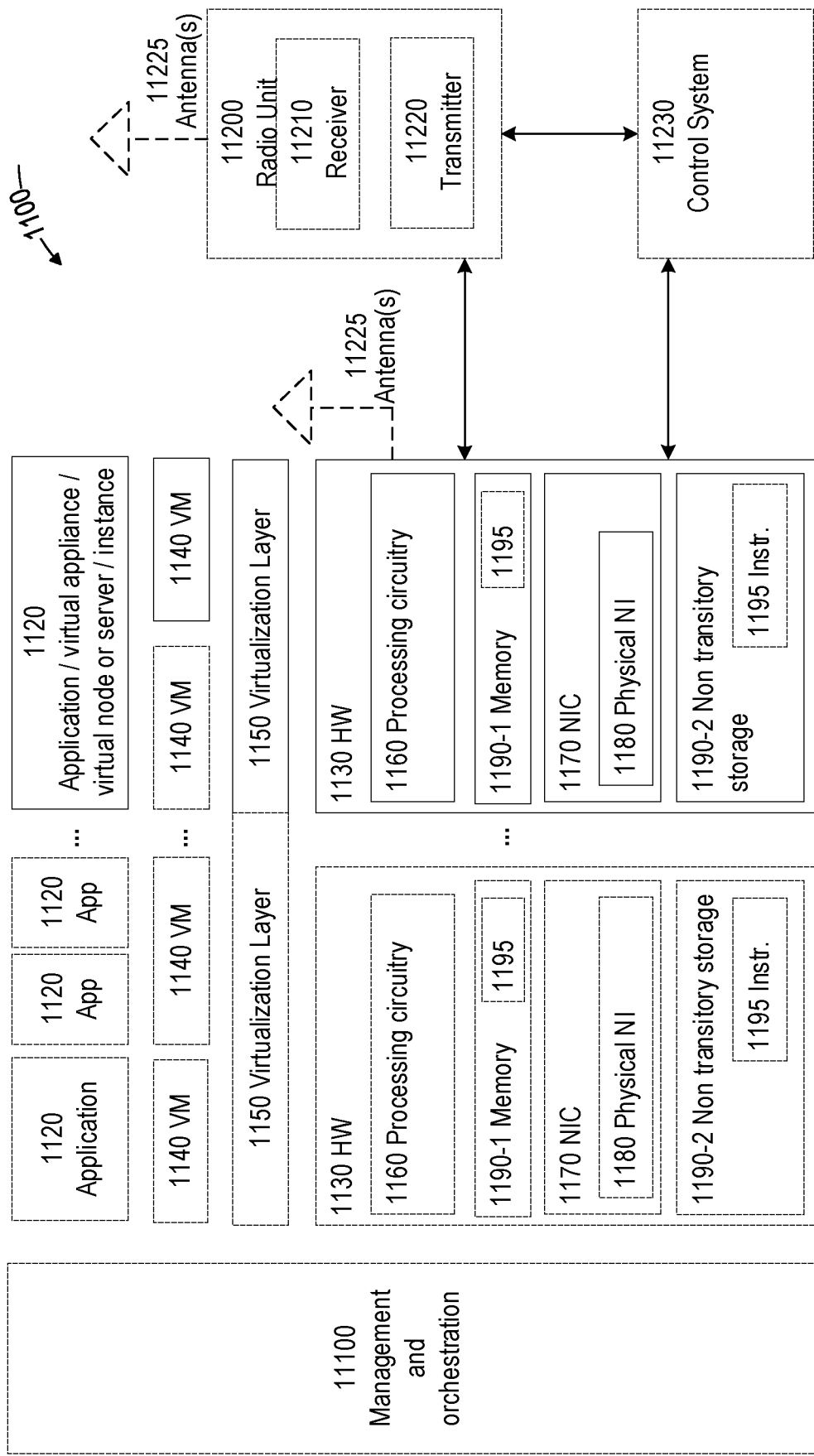
FIG. 11 is a block diagram illustrating an exemplary virtualization environment usable for implementation of various embodiments of network nodes described herein.

FIG. 11 is a schematic block diagram illustrating a virtualization environment 1100 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node can be entirely virtualized.

The functions can be implemented by one or more applications 1120 (which can alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100 can include general-purpose or special-purpose network hardware devices (or nodes) 1130 comprising a set of one or more processors or processing circuitry 1160, which can be commercial off-the-shelf (COTS) processors, dedicated Application Specific Integrated Circuits (ASICs), or any other type of processing circuitry including digital or analog hardware components or special purpose processors. Each hardware device can comprise memory 1190-1 which can be non-persistent memory for temporarily storing instructions 1195 or software executed by processing circuitry 1160. For example, instructions 1195 can include program instructions (also referred to as a computer program product) that, when executed by processing circuitry 1160, can configure hardware node 1120 to perform operations corresponding to various exemplary methods (e.g., procedures) described herein. Such operations can also be attributed to virtual node(s) 1120 that is/are hosted by hardware node 1130.

Each hardware device can comprise one or more network interface controllers (NICs) 1170, also known as network interface cards, which include physical network interface 1180. Each hardware device can also include non-transitory, persistent, machine-readable storage media 1190-2 having stored therein software 1195 and/or instructions executable by processing circuitry 1160. Software 1195 can include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and can be run by a corresponding virtualization layer 1150 or hypervisor. Different embodiments of the instance of virtual appliance 1120 can be implemented on one or more of virtual machines 1140, and the implementations can be made in different ways.

During operation, processing circuitry 1160 executes software 1195 to instantiate the hypervisor or virtualization layer 1150, which can sometimes be referred to as a virtual machine monitor (VMM). Virtualization layer 1150 can present a virtual operating platform that appears like networking hardware to virtual machine 1140.

As shown in FIG. 11, hardware 1130 can be a standalone network node with generic or specific components. Hardware 1130 can comprise antenna 11225 and can implement some functions via virtualization. Alternatively, hardware 1130 can be part of a larger cluster of hardware (e.g., such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1140 can be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 can be coupled to one or more antennas 11225. Radio units 11200 can communicate directly with hardware nodes 1130 via one or more appropriate network interfaces and can be used in combination with the virtual components to provide a virtual node with radio capabilities, such as a radio access node or a base station. Nodes arranged in this manner can also communicate with one or more UEs, such as described elsewhere herein. In some embodiments, some signaling can be performed via control system 11230, which can be used for communication between the hardware nodes 1130 and radio units 11200.

Figure 12:
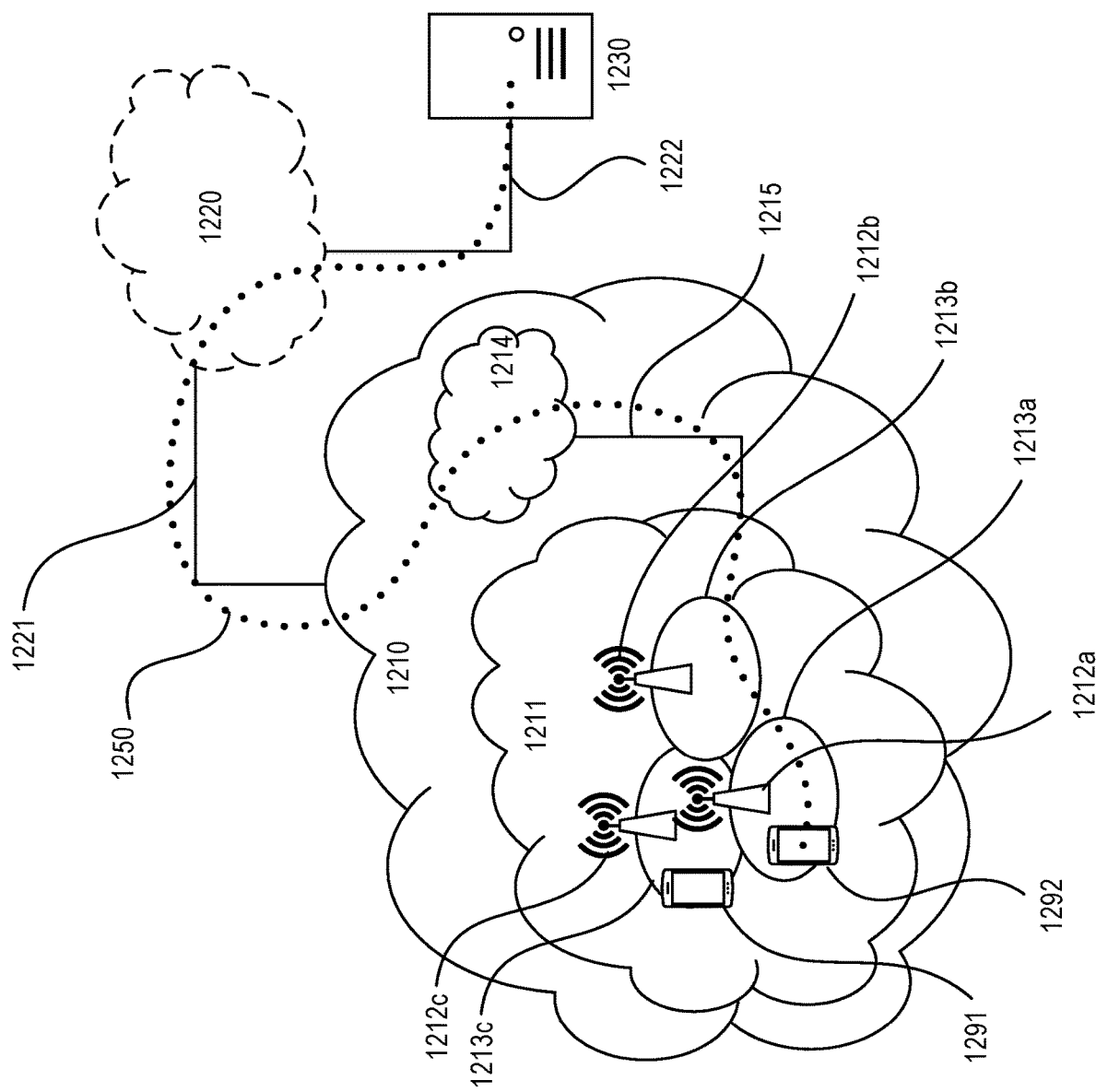
FIGS. 12-13 are block diagrams of various exemplary communication systems and/or networks, according to various exemplary embodiments of the present disclosure.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* can be configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the Telecommunication network 1210 is itself connected to host computer 1230, which can be embodied in the hardware and/or software of a standalone server, a cloud-implemented server, a distributed server or as processing resources in a server farm. Host computer 1230 can be under the ownership or control of a service provider or can be operated by the service provider or on behalf of the service provider. Connections 1221 and 1222 between telecommunication network 1210 and host computer 1230 can extend directly from core network 1214 to host computer 1230 or can go via an optional intermediate network 1220. Intermediate network 1220 can be one of, or a combination of more than one of, a public, private or hosted network; intermediate network 1220, if any, can be a backbone network or the Internet; in particular, intermediate network 1220 can comprise two or more sub-networks (not shown).

The communication system of FIG. 12 as a whole enables connectivity between the connected UEs 1291, 1292 and host computer 1230. The connectivity can be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 can be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which can have storage and/or processing capabilities. In particular, processing circuitry 1318 can comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 can be operable to provide a service to a remote user, such as UE 1330 connecting via OTT connection 1350 terminating at UE 1330 and host computer 1310. In providing the service to the remote user, host application 1312 can provide user data which is transmitted using OTT connection 1350.

Communication system 1300 can also include base station 1320 provided in a telecommunication system and comprising hardware 1325 enabling it to communicate with host computer 1310 and with UE 1330. Hardware 1325 can include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 can be configured to facilitate connection 1360 to host computer 1310. Connection 1360 can be direct, or it can pass through a core network (not shown in FIG. 13) of the telecommunication system and/or through one or more intermediate networks outside the telecommunication system. In the embodiment shown, hardware 1325 of base station 1320 can also include processing circuitry 1328, which can comprise one or more programmable processors, application-specific integrated circuits, field programmable gate arrays or combinations of these (not shown) adapted to execute instructions.

Base station 1320 also includes software 1321 stored internally or accessible via an external connection. For example, software 1321 can include program instructions (also referred to as a computer program product) that, when executed by processing circuitry 1328, can configure base station 1320 to perform operations corresponding to various exemplary methods (e.g., procedures) described herein.

Communication system 1300 can also include UE 1330 already referred to, whose hardware 1335 can include radio interface 1337 configured to set up and maintain wireless connection 1370 with a base station serving a coverage area in which UE 1330 is currently located. Hardware 1335 of UE 1330 can also include processing circuitry 1338, which can comprise one or more programmable processors, application-specific integrated circuits, field programmable gate arrays or combinations of these (not shown) adapted to execute instructions.

UE 1330 also includes software 1331, which is stored in or accessible by UE 1330 and executable by processing circuitry 1338. Software 1331 includes client application 1332. Client application 1332 can be operable to provide a service to a human or non-human user via UE 1330, with the support of host computer 1310. In host computer 1310, an executing host application 1312 can communicate with the executing client application 1332 via OTT connection 1350 terminating at UE 1330 and host computer 1310. In providing the service to the user, client application 1332 can receive request data from host application 1312 and provide user data in response to the request data. OTT connection 1350 can transfer both the request data and the user data. Client application 1332 can interact with the user to generate the user data that it provides. Software 1331 can also include program instructions (also referred to as a computer program product) that, when executed by processing circuitry 1338, can configure UE 1330 to perform operations corresponding to various exemplary methods (e.g., procedures) described herein.

Figure 13:
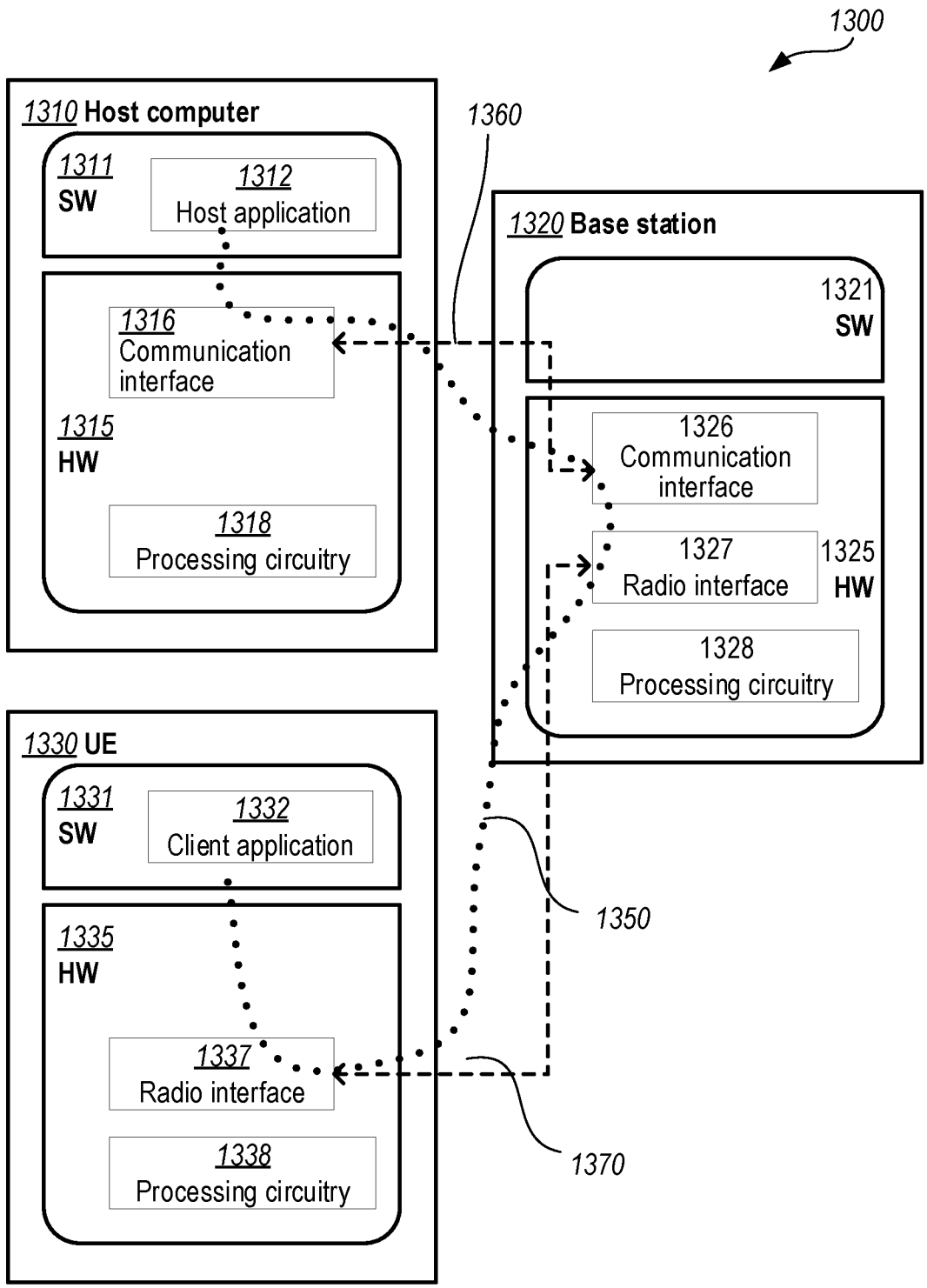

As an example, host computer 1310, base station 1320 and UE 1330 illustrated in FIG. 13 can be similar or identical to host computer 1230, one of base stations 1212*a-c,* and one of UEs 1291-1292 of FIG. 12, respectively. In other words, the inner workings of these entities can be as shown in FIG. 13 and the surrounding network topology can be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure can determine the routing, which it can be configured to hide from UE 1330 or from the service provider operating host computer 1310, or both. While OTT connection 1350 is active, the network infrastructure can further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1350 between host computer 1310 and UE 1330, in response to variations in the measurement results. The measurement procedure and/or the network functionality for reconfiguring OTT connection 1350 can be implemented in software 1311 and hardware 1315 of host computer 1310 or in software 1331 and hardware 1335 of UE 1330, or both. In embodiments, sensors (not shown) can be deployed in or in association with communication devices through which OTT connection 1350 passes; the sensors can participate in the measurement procedure by supplying values of the monitored quantities exemplified above, or supplying values of other physical quantities from which software 1311, 1331 can compute or estimate the monitored quantities. The reconfiguring of OTT connection 1350 can include message format, retransmission settings, preferred routing etc.; the reconfiguring need not affect base station 1320, and it can be unknown or imperceptible to base station 1320. Such procedures and functionalities can be known and practiced in the art. In certain embodiments, measurements can involve proprietary UE signaling facilitating host computer 1310's measurements of throughput, propagation times, latency and the like. The measurements can be implemented in that software 1311 and 1331 causes messages to be transmitted, in particular empty or 'dummy' messages, using OTT connection 1350 while it monitors propagation times, errors, etc.

FIG. 14 is a flowchart illustrating an exemplary method implemented in a communication system, in accordance with one embodiment. The communication system includes a host computer, a base station, and a UE such as those described herein with reference to other figures. For simplicity of the present disclosure, only drawing references to FIG. 14 will be included in this section. In step 1410, the host computer provides user data. In substep 1411 (which can be optional) of step 1410, the host computer provides the user data by executing a host application. In step 1420, the host computer initiates a transmission carrying the user data to the UE. In step 1430 (which can be optional), the base station transmits to the UE the user data which was carried in the transmission that the host computer initiated, in accordance with the teachings of the embodiments described throughout this disclosure. In step 1440 (which can also be optional), the UE executes a client application associated with the host application executed by the host computer.

FIG. 15 is a flowchart illustrating an exemplary method implemented in a communication system, in accordance with one embodiment. The communication system includes a host computer, a base station, and a UE such as those described herein with reference to other figures. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission can pass via the base station, in accordance with the teachings of the embodiments described throughout this disclosure. In step 1530 (which can be optional), the UE receives the user data carried in the transmission.

FIG. 16 is a flowchart illustrating an exemplary method implemented in a communication system, in accordance with one embodiment. The communication system includes a host computer, a base station, and a UE such as those described herein with reference to other figures. For simplicity of the present disclosure, only drawing references to FIG. 16 will be included in this section. In step 1610 (which can be optional), the UE receives input data provided by the host computer. Additionally or alternatively, in step 1620, the UE provides user data. In substep 1621 (which can be optional) of step 1620, the UE provides the user data by executing a client application. In substep 1611 (which can be optional) of step 1610, the UE executes a client application which provides the user data in reaction to the received input data provided by the host computer. In providing the user data, the executed client application can further consider user input received from the user. Regardless of the specific manner in which the user data was provided, the UE initiates, in substep 1630 (which can be optional), transmission of the user data to the host computer. In step 1640 of the method, the host computer receives the user data transmitted from the UE, in accordance with the teachings of the embodiments described throughout this disclosure.

FIG. 17 is a flowchart illustrating an exemplary method implemented in a communication system, in accordance with one embodiment. The communication system includes a host computer, a base station, and a UE such as those described herein with reference to other figures. For simplicity of the present disclosure, only drawing references to FIG. 17 will be included in this section. In step 1710 (which can be optional), in accordance with the teachings of the embodiments described throughout this disclosure, the base station receives user data from the UE. In step 1720 (which can be optional), the base station initiates transmission of the received user data to the host computer. In step 1730 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Example embodiments of the techniques and apparatus described herein include, but are not limited to, the following enumerated examples:

E1. A method, performed by a user equipment (UE), for receiving wake-up signals (WUS) transmitted by a network node in a radio access network (RAN), the method comprising:
receiving, from the network node, a WUS configuration comprising:
a WUS group assigned to the UE, and
an identifier of a first WUS resource associated with the assigned WUS group, wherein the first WUS resource is one of a first number of configured WUS resources for transmission of WUS;
determining a second WUS resource, of the configured WUS resources, to be used during a first monitoring occasion associated with the assigned WUS group, based on:
the identifier of the first WUS resource,
the first number of configured WUS resources, and
a system frame number (SFN) or hyper-SFN (HSFN) associated with the RAN; and
monitoring the second WUS resource for a WUS during the first monitoring occasion.

E2. The method of embodiment E1, wherein the second WUS resource is different from the first WUS resource.

E3. The method of any of embodiments E1-E2, further comprising:
determining a third resource, of the configured WUS resources, to be used during a second monitoring occasion associated with the assigned WUS group, wherein:
the second monitoring occasion is the next subsequent monitoring occasion, associated with the assigned WUS group, after the first monitoring occasion, and
the third resource is different from the second resource; and
monitoring the third WUS resource for a WUS during the second monitoring occasion.

E4. The method of embodiment E3, wherein the third resource is also different from the first resource.

E5. The method of any of embodiments E1-E4, wherein the second (and optionally the third) WUS resource is determined as an index, $WUS_{index}^{UE\ group}$, according to:

$$WUS_{index}^{UE\ group} = \left(WUS_{index} + div\left(\frac{HSFN}{T}\right)\right) \operatorname{modulus}(N_{WUS}),$$

where T is the UE's discontinuous reception (DRX) period, $WUS_{index}$ is the identifier of the first WUS resource, and $N_{WUS}$ is the first number of configured WUS resources.

E6. The method of any of embodiments E1-E4, wherein the second (and optionally the third) WUS resource is determined as an index, $WUS_{index}^{UE\ group}$, according to:

$WUS_{index}^{UE\ group} = (WUS_{index} + SFN) \operatorname{modulus} (N_{WUS})$, where $WUS_{index}$ is the identifier of the first WUS resource and $N_{WUS}$ is the first number of configured WUS resources.

E7. The method of any of embodiments E1-E4, wherein the second (and optionally the third) WUS resource is determined as an index, $WUS_{index}^{UE\ group}$, according to:

$$WUS_{index}^{UE\ group} = \left(WUS_{index} + \left\lfloor\frac{DRX_{max}}{P_{alt}}SFN\right\rfloor\right) \operatorname{modulus}(N_{WUS}),$$

where $DRX_{max}$ is the maximum discontinuous reception (DRX) period for the UE, $P_{alt}$ is a WUS resource alternation period, and $N_{WUS}$ is the first number of configured WUS resources.

E8. The method of embodiment E7, wherein $DRX_{max} \leq P_{alt}/N_{WUS}$.

E9. A method, performed by a network node in a radio access network (RAN), for transmitting wake-up signals (WUS) to one or more user equipment (UEs), the method comprising:
transmitting, to the one or more UEs, a WUS configuration comprising:
a WUS group assigned to the UEs, and
an identifier of a first WUS resource associated with the assigned WUS group, wherein the first WUS resource is one of a first number of configured WUS resources for transmission of WUS;
determining a second WUS resource, of the configured WUS resources, to be used for transmitting a WUS during a first monitoring occasion associated with the assigned WUS group, based on:
the identifier of the first WUS resource,
the first number of configured WUS resources, and
a system frame number (SFN) or hyper-SFN (HSFN) associated with the RAN; and
during the first monitoring occasion, transmitting a WUS using the second WUS resource.

E10. The method of embodiment E9, wherein the second WUS resource is different from the first WUS resource.

E11. The method of any of embodiments E9-E10, further comprising:
determining a third resource, of the configured WUS resources, to be used for transmitting a WUS during a second monitoring occasion associated with the assigned WUS group, wherein:
the second monitoring occasion is the next subsequent monitoring occasion, for the assigned WUS group, after the first monitoring occasion, and
the third resource is different from the second resource; and
during the second monitoring occasion, transmitting a WUS using the third WUS resource.

E12. The method of embodiment E11, wherein the third resource is also different from the first resource.

E13. The method of any of embodiments E9-E12, wherein the second (and optionally the third) WUS resource is determined as an index, $WUS_{index}^{UE\ group}$, according to:

$$WUS_{index}^{UE\ group} = \left(WUS_{index} + div\left(\frac{HSFN}{T}\right)\right) \operatorname{modulus}(N_{WUS}),$$

where T is the UE's discontinuous reception (DRX) period, $WUS_{index}$ is the identifier of the first WUS resource, and $N_{WUS}$ is the first number of configured WUS resources.

E14. The method of any of embodiments E9-E12, wherein the second (and optionally the third) WUS resource is determined as an index, $WUS_{index}^{UE\ group}$, according to:

$$WUS_{index}^{UE\ group} = (WUS_{index} + SFN) \text{ modulus } (N_{WUS}),$$

where $WUS_{index}$ is the identifier of the first WUS resource and $N_{WUS}$ is the first number of configured WUS resources.

E15. The method of any of embodiments E9-E12, wherein the second (and optionally the third) WUS resource is determined as an index, $WUS_{index}^{UE\ group}$, according to:

$$WUS_{index}^{UE\ group} = \left(WUS_{index} + \left\lfloor \frac{DRX_{max}}{P_{alt}} SFN \right\rfloor\right) \text{modulus}(N_{WUS}),$$

where $DRX_{max}$ is the maximum discontinuous reception (DRX) period for the UE, $P_{alt}$ is a WUS resource alternation period, and $N_{WUS}$ is the first number of configured WUS resources.

E16. The method of embodiment E15, wherein $DRX_{max} \leq P_{alt}|N_{WUS}$.

E17. A user equipment (UE) configured to receive wake-up signals (WUS) transmitted by a network node in a radio access network (RAN), the UE comprising:
radio interface circuitry configured to communicate with the network node; and
processing circuitry operably coupled to the radio interface circuitry, whereby the processing circuitry and the radio interface circuitry are configured to perform operations corresponding to any of the methods of embodiments E1-E8.

E18. A user equipment (UE) configured to receive wake-up signals (WUS) transmitted by a network node in a radio access network (RAN), the UE being further arranged to perform operations corresponding to any of the methods of embodiments E1-E8.

E19. A non-transitory, computer-readable medium storing computer-executable instructions that, when executed by processing circuitry of a user equipment (UE), configure the UE to perform operations corresponding to any of the methods of embodiments E1-E8.

E20. A computer program product comprising computer-executable instructions that, when executed by processing circuitry of a user equipment (UE), configure the UE to perform operations corresponding to any of the methods of embodiments E1-E8.

E21. A network node configured to transmit wake-up signals (WUS) to one or more user equipment (UEs) in a radio access network (RAN), the network node comprising:
radio interface circuitry operable to communicate with the UEs; and
processing circuitry coupled to the radio interface circuitry, whereby the processing circuitry and the radio interface circuitry are configured to perform operations corresponding to any of the methods of embodiments E9-E16.

E22. A network node configured to transmit wake-up signals (WUS) to one or more user equipment (UEs) in a radio access network (RAN), the network node being further arranged to perform operations corresponding to any of the methods of embodiments E9-E16.

E23. A non-transitory, computer-readable medium storing computer-executable instructions that, when executed by processing circuitry of a network node in a radio access network (RAN), configure the network node to perform operations corresponding to any of the methods of embodiments E9-E16.

E24. A computer program product comprising computer-executable instructions that, when executed by processing circuitry of a network node in a radio access network (RAN), configure the network node to perform operations corresponding to any of the methods of embodiments E9-E16.

The invention claimed is:

1. A method for a user equipment (UE) to monitor for wake-up signals (WUS) transmitted by a network node in a radio access network (RAN), the method comprising:
determining a second WUS resource for use during a first monitoring occasion associated with a WUS group assigned to the UE, based on the following:
an identifier of a first WUS resource, wherein the first and second WUS resources are part of a first number of configured WUS resources for transmission of WUS;
the first number of configured WUS resources; and
a system frame number (SFN) or a hyper-SFN (HSFN) associated with the RAN; and
monitoring for a WUS, from the network node, in the second WUS resource during the first monitoring occasion.

2. The method of claim 1, wherein one or more of the following applies:
the second WUS resource is different from the first WUS resource; and
the first number of configured WUS resources is greater than two.

3. The method of claim 1, wherein:
the UE is configured with a discontinuous reception (DRX) period; and
the DRX period is less than or equal to a WUS resource alternation period (Palt) divided by the first number of configured WUS resources.

4. The method of claim 1, further comprising receiving (710), from the network node, a WUS configuration comprising:
an identifier of the WUS group assigned to the UE, and
the identifier of the first WUS resource.

5. The method of claim 1, wherein the identifier of the first WUS resource is based on an identifier of the UE.

6. The method of claim 1, further comprising, based on detecting the WUS during the first monitoring occasion, monitoring for a control message, from the network node, at a predetermined duration after the first monitoring occasion.

7. The method of claim 1, further comprising:
determining a third WUS resource, of the configured WUS resources, for use during a second monitoring occasion that occurs after the first monitoring occasion and that is associated with the WUS group assigned to the UE; and
monitoring for a WUS, from the network node, in the third WUS resource during the second monitoring occasion.

8. The method of claim 7, wherein:
the second monitoring occasion is a next subsequent monitoring occasion that is associated with the WUS group; and
the third WUS resource is different from the second WUS resource.

9. The method of claim 8, wherein the third WUS resource is different from both the first WUS resource and the second WUS resource.

10. The method of claim 9, wherein:
the second monitoring occasion is a WUS resource alternation period (Palt) after the first monitoring occasion; and
the third WUS resource is the same as the second WUS resource.

11. A method for a network node in a radio access network (RAN) to transmit wake-up signals (WUS) to one or more user equipment (UEs), the method comprising:
determining a second WUS resource for use during a first monitoring occasion associated with a WUS group, based on the following:
an identifier of a first WUS resource, wherein the first and second resources are part of a first number of configured WUS resources for transmission of WUS;
the first number of configured WUS resources; and
a system frame number (SFN) or a hyper-SFN (HSFN) associated with the RAN; and
transmitting a WUS, to a UE assigned to the WUS group, in the second WUS resource during the first monitoring occasion.

12. The method of claim 11, wherein one of more of the following applies: the second WUS resource is different from the first WUS resource; and the first number of configured WUS resources is greater than two.

13. The method of claim 11, wherein:
the method further comprises configuring the UE with a discontinuous reception (DRX) period; and
the DRX period is less than or equal to a WUS resource alternation period (Palt) divided by the first number of configured WUS resources.

14. The method of claim 11, further comprising transmitting, to the UE, a WUS configuration comprising:
an identifier of the WUS group assigned to the UE; and
the identifier of the first WUS resource.

15. The method of claim 14, wherein the identifier of the first WUS resource is based on an identifier of the UE.

16. The method of claim 11, wherein:
the WUS is associated with a control message pending for the UE before the first monitoring occasion; and
the method further comprises transmitting the control message to the UE at a predetermined duration after the first monitoring occasion.

17. The method of claim 11, further comprising:
determining a third WUS resource, of the configured WUS resources, for use during a second monitoring occasion that occurs after the first monitoring occasion and that is associated with the WUS group; and
transmitting a further WUS, to the UE assigned to the WUS group, in the third WUS resource during the second monitoring occasion.

18. The method of claim 17, wherein:
the second monitoring occasion is a next subsequent monitoring occasion that is associated with the WUS group; and
the third WUS resource is different from the second WUS resource.

19. The method of claim 18, wherein the third WUS resource is different from both the first WUS resource and the second WUS resource.

20. The method of claim 19, wherein:
the second monitoring occasion is a WUS resource alternation period (Palt) after the first monitoring occasion; and
the third WUS resource is the same as the second WUS resource.

21. A user equipment (UE) configured to monitor for wake-up signals (WUS) transmitted by a network node in a radio access network (RAN), the UE comprising:
radio interface circuitry configured to communicate with the network node; and
processing circuitry operably coupled to the radio interface circuitry, whereby the processing circuitry and the radio interface circuitry are configured to perform operations corresponding to the method of claim 1.

22. A network node configured to transmit wake-up signals (WUS) to one or more user equipment (UEs) in a radio access network (RAN), the network node comprising:
radio interface circuitry configured to communicate with the UEs; and
processing circuitry operably coupled to the radio interface circuitry, whereby the processing circuitry and the radio interface circuitry are configured to perform operations corresponding to the method of claim 11.

* * * * *